(12) United States Patent
Kanai et al.

(10) Patent No.: US 6,872,491 B2
(45) Date of Patent: Mar. 29, 2005

(54) POSITIVE ELECTRODE ACTIVE MATERIAL AND LITHIUM ION SECONDARY BATTERY

(75) Inventors: Hideyuki Kanai, Kawasaki (JP);
Motoya Kanda, Yokohama (JP);
Koichi Kubo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 428 days.

(21) Appl. No.: 10/050,926

(22) Filed: Jan. 22, 2002

(65) Prior Publication Data

US 2002/0150820 A1 Oct. 17, 2002

(30) Foreign Application Priority Data

Jan. 23, 2001 (JP) .......................... 2001-014891

(51) Int. Cl.[7] .............................. H01M 4/52; H01M 4/58
(52) U.S. Cl. .................. 429/223; 429/221; 429/231.1; 429/231.3; 429/231.6
(58) Field of Search ................... 429/221, 223, 429/231.1, 231.2, 231.3, 231.6

(56) References Cited

U.S. PATENT DOCUMENTS

| 6,037,095 | A | 3/2000 | Miyasaka |
| 6,569,569 | B1 | 5/2003 | Kweon et al. |
| 2001/0016284 | A1 * | 8/2001 | Kweon et al. .............. 429/224 |
| 2002/0055042 | A1 | 5/2002 | Kweon et al. |

FOREIGN PATENT DOCUMENTS

| EP | 0 630 064 | 12/1994 |
| JP | 6-243871 | 9/1994 |
| JP | 7-37617 | 2/1995 |
| JP | 10-326621 | 12/1998 |
| JP | 11-345615 | 12/1999 |
| JP | 2001-23641 | 1/2001 |
| JP | 2001-291518 | 10/2001 |

* cited by examiner

Primary Examiner—Jonathan Crepeau
(74) Attorney, Agent, or Firm—Oblon, Spivak, McClelland, Maier & Neustadt, P.C.

(57) ABSTRACT

The present invention provides a positive electrode active material containing a composite oxide having a composition represented by a structural formula (1) given below:

$$Li_x(Ni_{1-y}Me1_y)(O_{2-z}X_z)+A \qquad (1)$$

19 Claims, 2 Drawing Sheets

POSITIVE ELECTRODE ACTIVE MATERIAL AND LITHIUM ION SECONDARY BATTERY

CROSS-REFERENCE TO RELATED APPLICATIONS

This application is based upon and claims the benefit of priority from prior Japanese Patent Application No. 2001-014891, filed Jan. 23, 2001, the entire contents of which are incorporated herein by reference.

BACKGROUND OF THE INVENTION

1. Field of the Invention

The present invention relates to a positive electrode active material containing a lithium-containing nickel oxide and to a lithium ion secondary battery equipped with the positive electrode active material.

2. Description of the Related Art

In recent years, electronic appliances such as portable personal computers and portable telephones are being miniaturized and made lightweight, and miniaturization and reduction of weight are being required for the secondary batteries used as power sources for these electronic appliances.

A lithium ion secondary battery using as a material of the negative electrode a substance capable of absorbing-desorbing lithium ions such as a carbon material has been developed as a secondary battery meeting the requirement described above, and has been put to a practical use as a power source for small electronic appliances. The secondary battery is smaller and lighter, and has a higher energy density, than a conventional lead accumulator or nickel-cadmium battery, and the demands for this particular secondary battery is on the increase.

A lithium-containing cobalt oxide ($LiCoO_2$), which permits a high discharge potential and a high energy density to be obtained, has been put to a practical use as a positive electrode active material of the lithium ion secondary battery. However, the amount of natural resources of cobalt used as the raw material of the complex compound is very small, and the ore deposit that can be commercially utilized is unevenly distributed in a small number of countries. As a result, cobalt is costly and invites a large fluctuation in price. It follows that the cobalt supply in the future will be unstable.

Under the circumstances, researches into positive electrode active materials other than lithium-containing cobalt oxide have been vigorously carried out in recent years. For example, various compounds are reported in respect of the composite oxides between lithium and manganese, which are synthesized by various manganese raw materials and lithium raw material. To be more specific, lithium manganese composite oxide represented by $LiMn_2O_4$ having a Spinel type crystal structure is allowed to exhibit 3 V of potential relative to lithium by electrochemical oxidation and has a theoretical charge-discharge capacity of 148 mAh/g.

However, the lithium ion secondary battery using a manganese oxide or a lithium manganese composite oxide as the positive electrode active material gives rise to the defect that, when the secondary battery is used under an environment not lower than room temperature, the deterioration in the capacity of the secondary battery is markedly increased. It should be noted that the manganese oxide or the lithium manganese composite oxide is rendered unstable under high temperatures so as to cause Mn to elute into the nonaqueous electrolyte, giving rise to the defect noted above. Particularly, a large lithium ion secondary battery has been developed in recent years in various technical fields for use in an electric automobile or in road leveling. In the large lithium ion secondary battery, the heat generation during the use of the secondary battery is rendered non-negligible with enlargement in the size of the lithium ion secondary battery, with the result that the temperature inside the battery tends to be rendered relatively high even if the ambient temperature is close to room temperature. Also, even when it come to a relatively small battery used in, for example, a small portable electronic appliance, it is possible for the battery to be used under a high temperature environment such as within a room of a vehicle in the midsummer, with the result that it is possible for the temperature inside the battery to be rendered relatively high. Under the circumstances, it is very difficult to put a positive electrode active material using manganese as a raw material to practical use.

Researches on the nickel composite oxides are being vigorously carried out as post cobalt composite oxides. A nickel composite oxide, e.g., $LiNiO_2$, exhibits a theoretical capacity of 180 to 200 mAh/g, which is larger than that of each of the $LiCoO_2$ series active material and the $LiMn_2O_4$ series active material. In addition, $LiNiO_2$ has an optimum discharge potential of about 3.6 V on the average and, thus, provides a highly hopeful positive electrode active material. However, the crystal structure of $LiNiO_2$ is unstable, giving rise to the problem that the initial discharge capacity is greatly lowered in the charge-discharge cycle test with increase in the number of the charge-discharge cycles, and to the additional problem in safety that rupture and ignition are brought about in the nail sticking test of the lithium ion secondary battery prepared by using $LiNiO_2$.

On the other hand, claim 1 of Japanese Patent Disclosure (Kokai) No. 10-326621 recites a secondary battery comprising a positive electrode using a lithium-containing metal composite oxide as an active material, a negative electrode using a metal composite oxide having an amorphous structure, and a nonaqueous electrolyte. Used as the active material of the positive electrode is a nickel-containing lithium composite oxide represented by $Li_xNi_{1-y}M_yO_{2-z}Xa$, where M represents at least one kind of an element selected from the group consisting of the elements of Group 2, Group 13, Group 14 of the Periodic Table and the transition metals, X represents a halogen atom, and x, y, z and a are defined to be $0.2<x\leq1.2$, $0\leq y\leq0.5$, $0\leq z\leq1$ and $0\leq a\leq2z$.

Also, the heading [0010] of the Japanese Patent document quoted above refers to the desirable concentrations of impurities other than the elements Li, Ni, Co and M contained in the positive electrode active material represented by the structural formula given above. Specifically, the Japanese Patent document quoted above teaches that it is desirable for the concentration of the impurity Fe to be not higher than 0.01% by weight (not higher than 100 ppm), for the concentration of the impurity Cu to be not higher than 0.01% by weight (not higher than 100 ppm), and for the concentration of each of the impurities Ca, Na and sulfate group ($SO_4$) to be not higher than 0.05% by weight (not higher than 500 ppm). Also, the Japanese Patent document quoted above teaches that it is desirable for the concentration of the water ($H_2O$) to be not higher than 0.1% by weight.

What should be noted is that the elements other than those specified in the structural formula, i.e., Fe, Cu, Na and sulfate group $SO_4$, are impurities in the Japanese Patent document in question and, thus, should desirably be contained in a smaller amount.

BRIEF SUMMARY OF THE INVENTION

An object of the present invention is to provide a positive electrode active material capable of eliminating rupture and ignition in the nail sticking test and also capable of improving the large discharge characteristics (discharge rate characteristics) and to provide a lithium ion secondary battery equipped with the particular positive electrode active material.

According to a first aspect of the present invention, there is provided a lithium ion secondary battery, comprising:

a positive electrode comprising an active material containing a composite oxide;

a negative electrode; and a nonaqueous electrolyte;

the composite oxide having a composition represented by a structural formula (1) given below:

$$Li_x(Ni_{1-y}Me1_y)(O_{2-z}X_z)+A \qquad (1)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm.

According to a second aspect of the present invention, there is provided a lithium ion secondary battery, comprising:

a positive electrode comprising an active material containing a composite oxide;

a negative electrode; and a nonaqueous electrolyte;

the composite oxide having a composition represented by a structural formula (2) given below:

$$Li_x(Ni_{1-y}Me1_y)(O_{2-z}X_z)+A+bB \qquad (2)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm, B contains at least one element selected from the group consisting of Si and Fe, and the content b of the element B in the composite oxide falls within a range of between 20 ppm and 500 ppm.

According to a third aspect of the present invention, there is provided a lithium ion secondary battery, comprising:

a positive electrode comprising an active material containing a composite oxide;

a negative electrode; and a nonaqueous electrolyte;

the composite oxide having a composition represented by a structural formula (3) given below:

$$Li_x(Ni_{1-v-s}Co_vMe2_s)(O_{2-z}X_z)+A \qquad (3)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb, and Bi, X is at least one kind of a halogen element selected from the group and z are $0.02 \leq x \leq 1.3$, $0.005 \leq v \leq 0.5$, consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, and each of the Na content, the K content and the S content of the composite oxide falls within a range of between 600 ppm and 3,000 ppm.

According to a fourth aspect of the present invention, there is provided a lithium ion secondary battery, comprising:

a positive electrode comprising an active material containing a composite oxide;

a negative electrode; and a nonaqueous electrolyte;

the composite oxide having a composition represented by a structural formula (4) given below:

$$Li_x(Ni_{1-v-s}Co_vMe2_s)(O_{2-z}X_z)+A+bB \qquad (4)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, each of the Na content, the K content and the S content of the composite oxide falls within a range of between 600 ppm and 3,000 ppm, B contains at least one element selected from the group consisting of Si and Fe, and the content b of the element B in the composite oxide falls within a range of between 20 ppm and 500 ppm.

According to a fifth aspect of the present invention, there is provided a positive electrode active material containing a composite oxide having a composition represented by a structural formula (1) given below:

$$Li_x(Ni_{1-y}Me1_y)(O_{2-z}X_z)+A \qquad (1)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm.

According to a sixth aspect of the present invention, there is provided a positive electrode active material containing a composite oxide having a composition represented by a structural formula (2) given below:

$$Li_x(Ni_{1-y}Me1_y)(O_{2-z}X_z)+A+bB \qquad (2)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm, B contains at least one element selected from the group consisting of Si and Fe, and the content b of the element B in the composite oxide falls within a range of between 20 ppm and 500 ppm.

According to a seventh aspect of the present invention, there is provided a positive electrode active material containing a composite oxide having a composition represented by a structural formula (3) given below:

$$Li_x(Ni_{1-v-s}Co_vMe2_s)(O_{2-z}X_z)+A \qquad (3)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W. Re, Pb, and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, and each of the Na content, the K content and the S content of the composite oxide falls within a range of between 600 ppm and 3,000 ppm.

According to an eighth aspect of the present invention, there is provided a positive electrode active material containing a composite oxide having a composition represented by a structural formula (4) given below:

$$Li_x(Ni_{1-v-s}Co_vMe2_s)(O_{2-z}X_z)+A+bB \qquad (4)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, each of the Na content, the K content and the S content of the composite oxide falls within a range of between 600 ppm and 3,000 ppm, B contains at least one element selected from the group consisting of Si and Fe, and the content b of the element B in the composite oxide falls within a range of between 20 ppm and 500 ppm.

BRIEF DESCRIPTION OF THE SEVERAL DRAWINGS

DETAILED DESCRIPTION OF THE INVENTION

Figure 1:
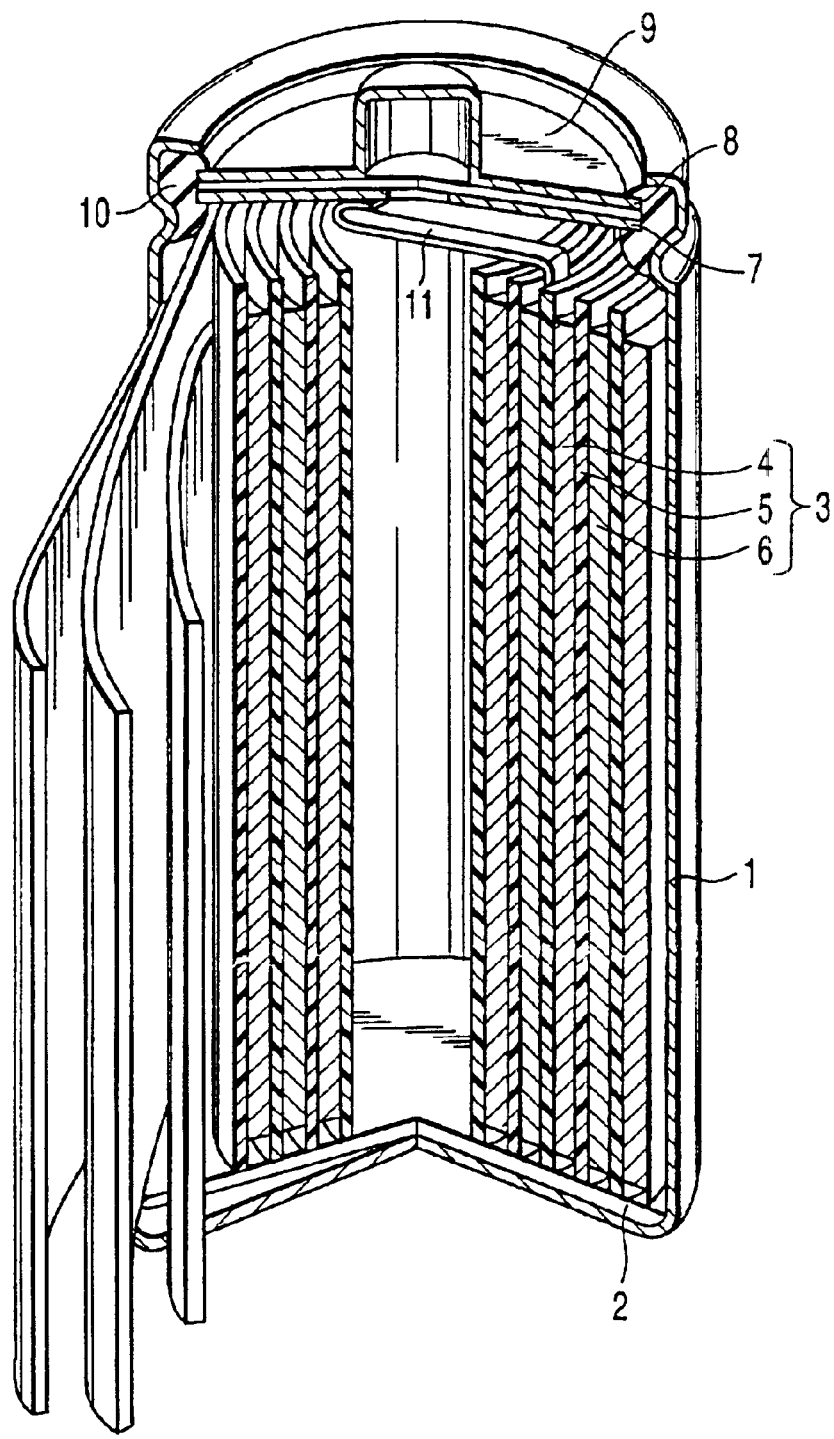
FIG. 1 is an oblique view, partly broken away, showing a cylindrical lithium ion secondary battery as an example of a lithium ion secondary battery according to one embodiment of the present invention.

The lithium ion secondary battery according to one embodiment of the present invention comprises a positive electrode containing an active material, a negative electrode, and a nonaqueous electrolyte. The active material noted above includes at least one kind of the positive electrode active material selected from the group consisting of first to sixth positive electrode active materials described herein later.

The nonaqueous electrolyte used in the present invention includes, for example, a liquid nonaqueous electrolyte prepared by, for example, dissolving a solute in a nonaqueous solvent, a polymer gel-like nonaqueous electrolyte in which a nonaqueous solvent and a solute are held by a polymer material, a polymer solid electrolyte containing a solute as a main component, and an inorganic solid nonaqueous electrolyte having a lithium ionic conductivity. Incidentally, what is described in conjunction with the liquid nonaqueous electrolyte described herein later can be used as the nonaqueous solvent and the solute contained in each of the nonaqueous electrolytes.

The polymer material contained in the gel-like nonaqueous electrolyte noted above includes, for example, polyacrylonitrile, polyacrylate, polyvinylidene fluoride (PVdF), polyethylene oxide (PEO), and polymers containing acrylonitrile, acrylate, vinylidene fluoride or ethylene oxide as the monomer unit. The polymer material contained in the polymer solid electrolyte noted above includes, for example, polyacrylonitrile, polyvinylidene fluoride (PVdF), polyethylene oxide and polymers containing acrylonitrile, vinylidene fluoride or ethylene oxide as a monomer unit. On the other hand, the inorganic solid nonaqueous electrolyte noted above includes, for example, a lithium-containing ceramic material. To be more specific, $Li_3N$, $Li_3PO_4$—$Li_2S$—$SiS$ glass, etc., can be used as the inorganic solid nonaqueous electrolyte.

An example of a lithium ion secondary battery according to the present invention will now be described.

The lithium ion secondary battery of the present invention comprises a positive electrode containing at least one kind of a positive electrode active material selected from the group consisting of first, second, third, fourth, fifth, and sixth positive electrode active materials, a negative electrode, a separator arranged between the positive electrode and the negative electrode, and a liquid nonaqueous electrolyte impregnated in at least the separator.

Each of the positive electrode, the separator, the negative electrode and the liquid nonaqueous electrolyte will now be described in detail.

1) Positive Electrode

The positive electrode includes a current collector and a positive electrode layer supported by the current collector and containing at least one kind of a positive electrode active material selected from the group consisting of first, second, third, fourth, fifth and sixth positive electrode active materials given below:

(First Positive Electrode Active Material)

The first positive electrode active material contains a composite oxide having a composition represented by chemical formula (1) given below:

$$Li_x(Ni_{1-y}Me1_y)(O_{2-z}X_z)+A \qquad (1)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm.

If the molar ratio x of lithium is less than 0.02, the crystal structure of the composite oxide is rendered highly unstable, with the result that the cycle characteristics of the secondary battery are degraded and the safety is lowered. On the other hand, if the molar ratio x of lithium exceeds 1.3, the discharge capacity and the safety of the secondary battery are lowered. It is more desirable for the molar ratio x of lithium to fall within a range of between 0.05 and 1.2.

The molar ratio y of the element Me1 should fall within a range of between 0.005 and 0.5. If the molar ratio y is lower than 0.005, it is difficult to improve the safety of the secondary battery. On the other hand, if the molar ratio y exceeds 0.5, the discharge capacity of the secondary battery is markedly decreased. It is more desirable for the molar ratio y of the element Me1 to fall within a range of between 0.01 and 0.35. Among the elements represented by Me1, it is desirable to use Al, Ti, Mn, Nb or Ta.

The molar ratio z of the halogen element X should fall within a range of between 0.01 and 0.5. If the molar ratio z is less than 0.01, it is difficult to improve the cycle characteristics and the safety of the secondary battery. On the other hand, if the molar ratio z exceeds 0.5, the discharge capacity of the secondary battery is markedly decreased., It is more desirable for the molar ratio z of the halogen element X to fall within a range of between 0.02 and 0.3. Also, among the halogen elements X, it is desirable to use F.

In one of the desired compositions of the composite oxide used in the present invention, the halogen element X contains F, the molar ratio x falls within a range of between 0.05 and 1.2, the molar ratio y falls within a range of between 0.01 and 0.35, and the molar ratio z falls within a range of between 0.02 and 0.3.

The composite oxide used in the present invention contains an element A. The composite oxide containing the element A is capable of suppressing a rapid increase in the battery temperature when a large current flows through the secondary battery by, for example, a short circuit so as to improve the safety of the secondary battery.

Where Na is contained in the composite oxide, the Na content should fall within a range of between 600 ppm and 3,000 ppm. If the Na content is lower than 600 ppm, it is impossible to obtain a high discharge capacity when the secondary battery is discharged at a high rate. On the other hand, if the Na content exceeds 3,000 ppm, the charge-discharge cycle characteristics of the secondary battery are degraded. It is more desirable for the Na content to fall within a range of between 1,000 ppm and 2,500 ppm. Where the Na content falls within a range of between 1,000 ppm and 2,500 ppm, it is possible to suppress the reduction in the capacity when the charge-discharge cycle in which the discharge is performed at a high rate is repeated.

Where K is contained in the composite oxide, the K content should fall within a range of between 600 ppm and 3,000 ppm. If the K content of the composite oxide is lower than 600 ppm, it is impossible to obtain a high discharge capacity when the secondary battery is discharged at a high rate. On the other hand, if the K content exceeds 3,000 ppm, the charge-discharge cycle characteristics of the secondary battery are degraded. It is more desirable for the K content to fall within a range of between 1,000 ppm and 2,500 ppm. If the K content is set to fall within a range of between 1,000 ppm and 2,500 ppm, it is possible to suppress the reduction of the capacity when the charge-discharge cycle in which the discharge is performed at a high rate is repeated.

Where S is contained in the composite oxide, the S content should fall within a range of between 600 ppm and 3,000 ppm. If the S content of the composite oxide is lower than 600 ppm, it is impossible to obtain a high discharge capacity when the secondary battery is discharged at a high rate. On the other hand, if the S content exceeds 3,000 ppm, the charge-discharge cycle characteristics of the secondary battery are degraded. It is more desirable for the S content to fall within a range of between 1,000 ppm and 2,500 ppm. If the S content is set to fall within a range of between 1,000 ppm and 2,500 ppm, it is possible to suppress the reduction of the capacity when the charge-discharge cycle in which the discharge is performed at a high rate is repeated.

It is desirable for the element A to include Ca in addition to at least one kind of the element selected from the group consisting of Na, K and S. It is desirable for the Ca content of the composite oxide to be not higher than 500 ppm. The Ca content of the composite oxide exceeding 500 ppm tends to promote the deterioration in any of the charge-discharge cycle characteristics, the large current discharge characteristics and the high rate charge-discharge characteristics. It is more desirable for the Ca content to fall within a range of between 20 ppm and 500 ppm. If the Ca content is set to fall within a range of between 20 ppm and 500 ppm, it is possible to improve markedly the large current discharge characteristics (discharge rate characteristics) or the high rate charge-discharge characteristics. It is furthermore desirable for the Ca content to fall within a range of between 50 ppm and 500 ppm.

It is possible to improve sufficiently the safety of the secondary battery even if the elements A are added singly. However, it is possible to further improve the safety of the secondary battery by adding a plurality of kinds of the elements A in combination. The desirable combinations of the elements A include a combination of Na and S, a combination of Ca, Na and S, a combination of Na and Ca, and a combination of S and Ca.

It is desirable for the total content "a" of the elements A in the composite oxide to fall within a range of between 600 ppm and 7000 ppm. If the total content "a" of the elements A is lower than 600 ppm, it is difficult to improve the large current discharge characteristics of the secondary battery. On the other hand, if the total content "a" of the elements A exceeds 7000 ppm, the charge-discharge cycle characteristics of the secondary battery tends to be degraded. It is more desirable for the total content "a" of the elements A to fall within a range of between 1000 ppm and 5000 ppm.

In the composite oxide represented by the chemical formula (1), it is desirable for at least a part of the element A contains at least one element selected from the group consisting of Na, K, S and Ca to be segregated. Particularly, it is desirable for at least a part of the element A to be precipitated in triple points present in grain boundaries of the composite oxide. If the crystal structure of the composite oxide is constructed to meet the particular requirement, it is possible to further improve both the safety and the cycle characteristics of the secondary battery.

The composite oxide used in the present invention can be manufactured by, for example, a solid state reaction process, a coprecipitation process, or hydrothermal synthesis. Particularly, it is desirable to obtain the composite oxide having a composition represented by chemical formula (1) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. If the heat treating temperature in the first stage exceeds 550° C. or if the heat treating temperature in the second stage exceeds 730° C., the element A melts so as to be attached to the surface of the particle. As a result, the et absorption-desorption of lithium is inhibited so as to make it difficult to further improve the safety and the cycle characteristics of the secondary battery. By applying the two stage heat treatment in which the firing temperature and the firing time are defined to fall within the ranges noted above, it is possible to arrange regularly the structure of the oxygen layer-Li layer-oxygen layer-(Ni+Me1) layer-oxygen layer-Li layer and to permit the precipitation of the element A in triple points present in boundaries of the crystal grains. As a result, it is possible to further improve the safety and the charge-discharge cycle characteristics of the secondary battery.

As described above, the lithium ion secondary battery of the present invention comprising a positive electrode containing the first positive electrode active material permits suppressing a rapid elevation of the battery temperature when a large current flows therethrough under the state of a short circuit as in the nail sticking test, making it possible to prevent in advance rupture and ignition. It follows that the safety of the secondary battery can be improved. It is considered reasonable to understand that the element A containing at least one element selected from the group consisting of Na, K, Ca and S serves to lower the series resistance of the positive electrode active material so as to suppress the heat generation caused by the Joule heat derived from the flow of a large current, thereby producing the prominent effect described above. Also, the secondary battery of the present invention makes it possible to realize a large discharge capacity, excellent cycle characteristics and excellent large current discharge characteristics (discharge rate characteristics).

(Second Positive Electrode Active Material)

The second positive electrode active material used in the present invention comprises a composite oxide represented by chemical formula (2) given below:

$$Li_x(Ni_{1-y}Me1_y)(O_{2-z}X_z)+A+bB \qquad (2)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm, B contains at least one element selected from the group consisting of Si and Fe, and the content b of the element B in said composite oxide falls within a range of between 20 ppm and 500 ppm.

The molar ratio x of lithium contained in the composite oxide defined in chemical formula (2) falls within a range of between 0.02 and 1.3, as described above. The reason for the definition of the molar ratio x of lithium is as described previously in conjunction with the composite oxide represented by chemical formula (1) described previously. It is more desirable for the molar ratio x of lithium to fall within a range of between 0.05 and 1.2.

The molar ratio y of the element Me1 contained in the composite oxide defined in chemical formula (2) falls within a range of between 0.005 and 0.5, as described above. The reason for the definition of the molar ratio y of the element Me1 is as described previously in conjunction with the composite oxide represented by chemical formula (1) described previously. It is more desirable for the molar ratio y of the element Me1 to fall within a range of between 0.01 and 0.35. It is desirable to use as the element Me1 the elements described previously in conjunction with the first positive electrode active material.

The molar ratio z of the halogen element X contained in the composite oxide defined in chemical formula (2) falls within a range of between 0.01 and 0.5, as described above. The reason for the definition of the molar ratio z of the halogen element X is as described previously in conjunction with the composite oxide represented by chemical formula (1) described previously. It is more desirable for the molar ratio z of the halogen element X to fall within a range of between 0.02 and 0.3. It is desirable to use F as the halogen element X.

Where Na is contained in the composite oxide defined in chemical formula (2), it is desirable for the Na content to fall within a range of between 600 ppm and 3,000 ppm for the same reasons as those described previously in conjunction with the first positive electrode active material. It is more desirable for the Na content to fall within a range of between 1,000 ppm and 2,500 ppm for the same reasons as those described previously in conjunction with the first positive electrode active material.

Where K is contained in the composite oxide defined in chemical formula (2), it is desirable for the K content to fall within a range of between 600 ppm and 3,000 ppm for the same reasons as those described previously in conjunction with the first positive electrode active material. It is more desirable for the K content to fall within a range of between 1,000 ppm and 2,500 ppm for the same reasons as those described previously in conjunction with the first positive electrode active material.

Where S is contained in the composite oxide defined in chemical formula (2), it is desirable for the S content to fall within a range of between 600 ppm and 3,000 ppm for the same reasons as those described previously in conjunction with the first positive electrode active material. It is more desirable for the S content to fall within a range of between 1,000 ppm and 2,500 ppm for the same reasons as those described previously in conjunction with the first positive electrode active material.

It is desirable for the element A to include Ca together with at least one element selected from the group consisting of Na, K and S. It is desirable for the Ca content to be not higher than 500 ppm for the same reasons as those described previously in conjunction with the first positive electrode active material. It is more desirable for the Ca content to fall within a range of between 20 ppm and 500 ppm and, furthermore desirably between 50 ppm and 500 ppm for the same reasons as those described previously in conjunction with the first positive electrode active material.

It is possible to improve sufficiently the safety of the secondary battery by adding these elements A singly. However, the safety of the secondary battery can be further improved by adding simultaneously a plurality of different kinds of the elements A in combination. The desirable combinations of the elements A are as described previously in conjunction with the first positive electrode active material.

It is desirable for the total content "a" of the elements A in the composite oxide to fall within a range of between 600 ppm and 7000 ppm for the same reasons as those described previously in conjunction with the first positive electrode active material. It is more desirable for the total content "a" of the elements A to fall within a range of 1000 ppm and 5000 ppm.

The composite oxide contained in the second positive electrode active material also contains the element B. Where the element B is contained in the composite oxide, it is possible to suppress more effectively the elevation of the battery temperature when a large current flows through the secondary battery by, for example, the occurrence of a short circuit so as to further improve the safety of the secondary battery. However, if the content b of the element B is lower than 20 ppm, it is difficult to improve sufficiently the safety of the secondary battery. On the other hand, if the content b of the element B exceeds 500 ppm, the charge-discharge cycle characteristics of the secondary battery tend to be markedly lowered. It is more desirable for the content b of the element B to fall within a range of between 20 ppm and 250 ppm. Further, where the element B contains both of Si and Fe, it is possible to further improve the safety and the charge-discharge cycle characteristics of the secondary battery.

In the composite oxide represented by chemical formula (2), it is desirable for at least a part of the element A containing at least one kind of the element selected from the group consisting of Na, K, Ca and S and for at least a part of the element B containing at least one kind of the element selected from the group consisting of Si and Fe to be segregated. Particularly, it is desirable for at least a part of at least one element of the elements A and B to be precipitated in triple points present in grain boundaries of the composite oxide. Where the crystal structure of the composite oxide is constructed in this fashion, it is possible to further improve both the safety and the cycle characteristics of the secondary battery.

The composite oxide used in the present invention can be prepared by, for example, a solid state reaction process, a coprecipitation process or hydrothermal synthesis. Particularly, it is desirable to obtain the composite oxide having a composition represented by chemical formula (2) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. If the heat treating temperature in the first stage exceeds 550° C. or if the heat treating temperature in the second stage exceeds 730° C., the compound of element A and the compound of element B melt so as to be attached to the surface of the particle. As a result, the absorption-desorption of lithium is inhibited so as to make it difficult to improve the safety and the cycle characteristics of the secondary battery. By applying the two stage heat treatment in which the firing temperature and the firing time are defined to fall within the ranges noted above, it is possible to arrange regularly the structure of the oxygen layer-Li layer-oxygen layer-(Ni+Me1) layer-oxygen layer-Li layer and to permit the precipitation of the element A and the element B in triple points present in grain boundaries of the composite oxide. As a result, it is possible to further improve the safety and the charge-discharge cycle characteristics of the secondary battery.

As described above, the lithium ion secondary battery of the present invention comprising a positive electrode containing the second positive electrode active material permits suppressing a rapid elevation of the battery temperature when a large current flows therethrough under the state of a short circuit as in the nail sticking test, making it possible to prevent in advance rupture and ignition. It follows that the safety of the secondary battery can be improved. It is considered reasonable to understand that the element A containing at least one element selected from the group consisting of Na, K, Ca and S and the element B containing at least one element selected from the group consisting of Si and Fe serve to lower the series resistance of the positive electrode active material so as to produce a synergetic effect that the heat generation caused by the Joule heat derived from the flow of a large current can be suppressed, thereby producing the prominent effect described above. Also, the secondary battery of the present invention makes it possible to realize a large discharge capacity, excellent cycle characteristics and excellent large current discharge characteristics (discharge rate characteristics).

(Third Positive Electrode Active Material)

The third positive electrode active material used in the present invention comprises a composite oxide having a composition represented by chemical formula (3) given below:

$$Li_x(Ni_{1-v-s}Co_vMe2_s)(O_{2-z}X_z)+A \qquad (3)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, and each of the Na content, the K content and the S content of the composite oxide falls within a range of between 600 ppm and 3,000 ppm.

The molar ratio x of lithium is defined to fall within a range of between 0.02 and 1.3 as described above. If the molar ratio x of lithium is lower than 0.02, the crystal structure of the composite oxide is rendered highly unstable, with the result that the cycle characteristics of the secondary battery are degraded and the safety of secondary battery is lowered. On the other hand, if the molar ratio x of lithium exceeds 1.3, the discharge capacity and the safety of the secondary battery are lowered. It is more desirable for the molar ratio x of lithium to fall within a range of between 0.05 and 1.2.

The composite oxide also contains Co. Where Co is contained in the composite oxide, it is possible to suppress the spurting of gas from within the secondary battery in the event of a short circuit as in the nail sticking test and to further suppress the temperature elevation of the secondary battery in the event of a short circuit. It is desirable for the molar ratio v of Co to fall within a range of between 0.005 and 0.5. If the molar ratio v of Co is lower than 0.005, it is difficult to improve sufficiently the safety of the secondary battery. On the other hand, if the molar ratio v of Co exceeds 0.5, the charge-discharge cycle characteristics and the discharge capacity of the secondary battery are markedly lowered.

The composite oxide also contains the element Me2. It is desirable for the molar ratio s of the element Me2 to fall within a range of between 0.005 and 0.5. If the molar ratio s of the element Me2 is lower than 0.005, it is difficult to improve sufficiently the safety of the secondary battery. On the other hand, if the molar ratio s of the element Me2 exceeds 0.5, the discharge capacity of the secondary battery is markedly lowered. It is more desirable for the molar ratio s of the element Me2 to fall within a range of between 0.01 and 0.35. Also, it is desirable to use Al, Ti, Mn, Nb or Ta as the element Me2.

The composite oxide also contains the halogen element X. It is desirable for the molar ratio z of the halogen element X to fall within a range of between 0.01 and 0.5. If the molar ratio z of the halogen element X is lower than 0.01, it is difficult to improve the cycle characteristics and the safety of the secondary battery. On the other hand, if the molar ratio z of the halogen element X exceeds 0.5, the discharge capacity of the secondary battery is markedly lowered. It is more desirable for the molar ratio z of the halogen element X to fall within a range of between 0.02 and 0.3. Also, it is desirable to use F as the halogen element X.

In one of the desired compositions of the composite oxide used in the present invention, the halogen element X contains F, the molar ratio x falls within a range of between 0.05 and 1.2, the molar ratio v falls within a range of between 0.005 and 0.5, the molar ratio s falls within a range of between 0.01 and 0.35, and the molar ratio z falls within a range of between 0.02 and 0.3.

Where Na is contained in the composite oxide, the Na content should fall within a range of between 600 ppm and 3,000 ppm for the same reasons as those described previously in conjunction with the first positive electrode active material. It is more desirable for the Na content to fall within a range of between 1,000 ppm and 2,500 ppm for the same reasons as those described previously in conjunction with the first positive electrode active material.

Where K is contained in the composite oxide, the K content should fall within a range of between 600 ppm and 3,000 ppm for the same reasons as those described previously in conjunction with the first positive electrode active material. It is more desirable for the K content to fall within a range of between 1,000 ppm and 2,500 ppm for the same reasons as those described previously in conjunction with the first positive electrode active material.

Where S is contained in the composite oxide, the S content should fall within a range of between 600 ppm and 3,000 ppm for the same reasons as those described previously in conjunction with the first positive electrode active material. It is more desirable for the S content to fall within a range of between 1,000 ppm and 2,500 ppm for the same reasons as those described previously in conjunction with the first positive electrode active material.

It is desirable for the element A to include Ca in addition to at least one kind of the element selected from the group consisting of Na, K and S. It is desirable for the Ca content of the composite oxide to be not higher than 500 ppm for the same reasons as those described previously in conjunction with the first positive electrode active material. It is more desirable for the Ca content to fall within a range of between 20 ppm and 500 ppm, furthermore desirably between 50 ppm and 500 ppm.

It is possible to improve sufficiently the safety of the secondary battery even if the elements A are added singly. However, it is possible to further improve the safety of the secondary battery by adding a plurality of kinds of the elements A in combination. The desirable combinations of the elements A include the combinations described previously in conjunction with the first positive electrode active material.

It is desirable for the total content "a" of the elements A in the composite oxide to fall within a range of between 600 ppm and 7000 ppm for the same reasons as those described previously in conjunction with the first positive electrode active material. It is more desirable for the total content "a" of the elements A to fall within a range of between 1000 ppm and 5000 ppm.

In the composite oxide represented by the chemical formula (3), it is desirable for at least a part of the element A containing at least one element selected from the group consisting of Na, K, S and Ca to be segregated. Particularly, it is desirable for at least a part of the element A to be precipitated in the triple point present in the boundary of the crystal grains of the composite oxide. If the crystal structure of the composite oxide is constructed to meet the particular requirement, it is possible to further improve both the safety and the cycle characteristics of the secondary battery.

The composite oxide used in the present invention can be manufactured by, for example, a solid state reaction process, a coprecipitation process, or hydrothermal synthesis. Particularly, it is desirable to obtain the composite oxide having a composition represented by chemical formula (3) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. By employing the particular process, it is possible to arrange regularly the structure of the oxygen layer-Li layer-oxygen layer-(Ni+Co+Me2) layer-oxygen layer-Li layer and to permit the precipitation of the element A in triple points present in grain boundaries of the composite oxide. As a result, it is possible to further improve the safety and the charge-discharge cycle characteristics of the secondary battery.

As described above, the lithium ion secondary battery of the present invention comprising a positive electrode containing the third positive electrode active material permits effectively suppressing a rapid elevation of the battery temperature when a large current flows therethrough under the state of a short circuit as in the nail sticking test, making it possible to prevent in advance dangers such as rupture and ignition. It follows that the safety of the secondary battery can be markedly improved. Also, the secondary battery of the present invention makes it possible to obtain the large discharge capacity, and to further improve the cycle characteristics and the large current discharge characteristics (discharge rate characteristics).

(Fourth Positive Electrode Active Material)

The fourth positive electrode active material contains a composite oxide having a composition represented by chemical formula (4) given below:

$$Li_x(Ni_{1-v-s}Co_vMe2_s)(O_{2-z}X_z)+A+bB \qquad (4)$$

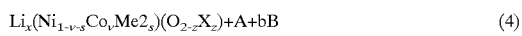

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb, and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains at least one element selected from the group consisting of Na, K and S, each of the Na content, the K content and the S content of the composite oxide falls within a range of between 600 ppm and 3,000 ppm, B contains at least one element selected from the group consisting of Si and Fe, and the content b of the element B in said composite oxide falls within a range of between 20 ppm and 500 ppm.

The molar ratio x of lithium is defined to fall within a range of between 0.02 and 1.3 as described above for the same reasons as those described previously in conjunction with the third positive electrode active material. It is more desirable for the molar ratio x of lithium to fall within a range of between 0.05 and 1.2.

The composite oxide also contains Co. It is desirable for the molar ratio v of Co to fall within a range of between 0.005 and 0.5 for the same reasons as those described previously in conjunction with the third positive electrode active material.

The composite oxide also contains the element Me2. It is desirable for the molar ratio s of the element Me2 to fall within a range of between 0.005 and 0.5 for the same reasons as those described previously in conjunction with the third positive electrode active material. It is more desirable for the molar ratio s of the element Me2 to fall within a range of between 0.01 and 0.35. Also, it is desirable to use the elements described previously in conjunction with the third positive electrode active material as the element Me2.

The composite oxide also contains the halogen element X. It is desirable for the molar ratio z of the halogen element X to fall within a range of between 0.01 and 0.5 for the same reasons as those described previously in conjunction with the third positive electrode active material. It is more desirable for the molar ratio z of the halogen element X to fall within a range of between 0.02 and 0.3. Also, it is desirable to use F as the halogen element X.

Where Na is contained in the composite oxide, the Na content should fall within a range of between 600 ppm and 3,000 ppm for the same reasons as those described previously in conjunction with the first positive electrode active material. It is more desirable for the Na content to fall within a range of between 1,000 ppm and 2,500 ppm for the same reasons as those described previously in conjunction with the first positive electrode active material.

Where K is contained in the composite oxide, the K content should fall within a range of between 600 ppm and 3,000 ppm for the same reasons as those described previously in conjunction with the first positive electrode active material. It is more desirable for the K content to fall within a range of between 1,000 ppm and 2,500 ppm for the same reasons as those described previously in conjunction with the first positive electrode active material.

Where S is contained in the composite oxide, the S content should fall within a range of between 600 ppm and 3,000 ppm for the same reasons as those described previously in conjunction with the first positive electrode active material. It is more desirable for the S content to fall within a range of between 1,000 ppm and 2,500 ppm for the same reasons as those described previously in conjunction with the first positive electrode active material.

It is desirable for the element A to include Ca in addition to at least one kind of the element selected from the group consisting of Na, K and S. It is desirable for the Ca content of the composite oxide to be not higher than 500 ppm for the same reasons as those described previously in conjunction with the first positive electrode active material. It is more desirable for the Ca content to fall within a range of between 20 ppm and 500 ppm, furthermore desirably between 50 ppm and 500 ppm.

It is possible to improve sufficiently the safety of the secondary battery even if the elements A are added singly. However, it is possible to further improve the safety of the secondary battery by adding a plurality of kinds of the elements A in combination. The desirable combinations of the elements A include the combinations described previously in conjunction with the first positive electrode active material.

It is desirable for the total content "a" of the elements A in the composite oxide to fall within a range of between 600 ppm and 7000 ppm for the same reasons as those described previously in conjunction with the first positive electrode active material. It is more desirable for the total content "a" of the elements A to fall within a range of between 1000 ppm and 5000 ppm.

The content b of element B in the composite oxide is defined to fall within the range described above for the same reasons as those described previously in conjunction with the first positive oxide active material. It is more desirable for the content b of element B to fall within a range of between 20 ppm and 250 ppm. Further, where the element B contains both of Si and Fe, it is possible to further improve the safety and the charge-discharge cycle characteristics of the secondary battery.

In the composite oxide represented by the chemical formula (4), it is desirable for at least a part of at least one kind of the element A selected from the group consisting of Na, K, S and Ca and for at least a part of at least one kind of the element B selected from the group consisting of Si and Fe to be segregated. Particularly, it is desirable for at least a part of one of the element A and the element B to be precipitated in triple points present in grain boundaries of the composite oxide. If the crystal structure of the composite oxide is constructed to meet the particular requirement, it is possible to further improve both the safety and the cycle characteristics of the secondary battery.

The composite oxide used in the present invention can be manufactured by, for example, a solid state reaction process, a coprecipitation process, or hydrothermal synthesis. Particularly, it is desirable to obtain the composite oxide having a composition represented by chemical formula (4) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. By employing the particular process, it is possible to arrange regularly the structure of the oxygen layer-Li layer-oxygen layer-(Ni+Co+Me2) layer-oxygen layer-Li layer and to permit the precipitation of the element A and the element B in triple points present in grain boundaries of the composite oxide. As a result, it is possible to further improve the safety and the charge-discharge cycle characteristics of the secondary battery.

As described above, the lithium ion secondary battery of the present invention comprising a positive electrode containing the fourth positive electrode active material permits effectively suppressing a rapid elevation of the battery temperature when a large current flows therethrough under the state of a short circuit as in the nail sticking test, making it possible to prevent in advance dangers such as rupture and ignition. It follows that the safety of the secondary battery can be markedly improved. Also, the secondary battery of the present invention makes it possible to obtain a large discharge capacity and to further improve the charge-discharge cycle characteristics and the large current discharge characteristics (discharge rate characteristics).

(Fifth Positive Electrode Active Material)

The fifth positive electrode active material contains a composite oxide having a composition represented by chemical formula (5) given below:

$$Li_x(Ni_{1-v-t}Co_vMe3_t)(O_{2-z}X_z)+A \quad (5)$$

where Me3 is at least one kind of an element selected from the group consisting of Ti, V, Cr, Zr, Nb, Mo, Hf, Ta and W, X is at least one kind of a halogen element selected from the group consisting of F, Cl, Br and I, the molar ratios x, v, t and z are $0.02 \leq x \leq 1.3$, $0.005 \leq v \leq 1.3$, $0.005 \leq t \leq 0.5$, and $0.01 \leq z \leq 0.5$, A contains at least one element selected from the group consisting of Na, K and S, and each of the Na content, the K content and the S content of the composite oxide falls within a range of between 600 ppm and 3,000 ppm.

The molar ratio x of lithium falls within a range of between 0.02 and 1.3 as described above. If the molar ratio x of lithium is lower than 0.02, the crystal structure of the composite oxide is rendered highly unstable so as to degraded the cycle characteristics of the secondary battery and to lower the safety of the secondary battery. On the other hand, if the molar ratio x of lithium exceeds 1.3, the discharge capacity and the safety of the secondary battery are lowered. It is more desirable for the molar ratio x of lithium to fall within a range of between 0.05 and 1.2.

The molar ratio t of the element Me3 falls within a range of between 0.005 and 0.5 as described above. If the molar ratio t of the element Me3 is lower than 0.005, it is difficult to improve the safety of the secondary battery. On the other hand, if the molar ratio t of the element Me3 exceeds 0.5, the discharge capacity of the secondary battery is markedly lowered. It is more desirable for the molar ratio t of the element Me3 to fall within a range of between 0.01 and 0.35. Also, it is desirable to use Ti, Nb or Ta as the element Me3.

The composite oxide also contains Co. Where Co is contained in the composite oxide, it is possible to suppress the spurting of the gas from within the secondary battery in the event of a short circuit as in the nail sticking test and to further suppress the temperature elevation of the secondary battery in the event of a short circuit. It is desirable for the molar ratio v of Co to fall within a range of between 0.005 and 0.5. If the molar ratio v of Co is lower than 0.005, it is difficult to improve sufficiently the safety of the secondary battery. On the other hand, if the molar ratio v of Co exceeds 0.5, the charge-discharge cycle characteristics and the discharge capacity of the secondary battery are markedly lowered.

The composite oxide also contains the halogen element X. It is desirable for the molar ratio z of the halogen element X to fall within a range of between 0.01 and 0.5. If the molar ratio z of the halogen element X is lower than 0.01, it is difficult to improve the cycle characteristics and the safety of the secondary battery. On the other hand, if the molar ratio z of the halogen element X exceeds 0.5, the discharge capacity of the secondary battery is markedly lowered. It is more desirable for the molar ratio z of the halogen element X to fall within a range of between 0.02 and 0.3. Also, it is desirable to use F as the halogen element X.

In one of the desired compositions of the composite oxide used in the present invention, the halogen element X contains F, the molar ratio x falls within a range of between 0.05 and 1.2, the molar ratio v falls within a range of between 0.005 and 0.5, the molar ratio t falls within a range of between 0.01 and 0.35, and the molar ratio z falls within a range of between 0.02 and 0.3.

Where Na is contained in the composite oxide, the Na content should fall within a range of between 600 ppm and 3,000 ppm for the same reasons as those described previously in conjunction with the first positive electrode active material. It is more desirable for the Na content to fall within a range of between 1,000 ppm and 2,500 ppm for the same reasons as those described previously in conjunction with the first positive electrode active material.

Where K is contained in the composite oxide, the K content should fall within a range of between 600 ppm and 3,000 ppm for the same reasons as those described previously in conjunction with the first positive electrode active material. It is more desirable for the K content to fall within a range of between 1,000 ppm and 2,500 ppm for the same reasons as those described previously in conjunction with the first positive electrode active material.

Where S is contained in the composite oxide, the S content should fall within a range of between 600 ppm and 3,000 ppm for the same reasons as those described previously in conjunction with the first positive electrode active material. It is more desirable for the S content to fall within a range of between 1,000 ppm and 2,500 ppm for the same reasons as those described previously in conjunction with the first positive electrode active material.

It is desirable for the element A to include Ca in addition to at least one kind of the element selected from the group consisting of Na, K and S. It is desirable for the Ca content of the composite oxide to be not higher than 500 ppm for the same reasons as those described previously in conjunction with the first positive electrode active material. It is more desirable for the Ca content to fall within a range of between 20 ppm and 500 ppm, furthermore desirably between 50 ppm and 500 ppm.

It is possible to improve sufficiently the safety of the secondary battery even if the elements A are added singly. However, it is possible to further improve the safety of the secondary battery by adding a plurality of kinds of the elements A in combination. The desirable combinations of the elements A include the combinations described previously in conjunction with the first positive electrode active material.

It is desirable for the total content "a" of the elements A in the composite oxide to fall within a range of between 600 ppm and 7000 ppm for the same reasons as those described previously in conjunction with the first positive electrode active material. It is more desirable for the total content "a" of the elements A to fall within a range of between 1000 ppm and 5000 ppm.

In the composite oxide represented by the chemical formula (5), it is desirable for at least a part of the element A containing at least one element selected from the group consisting of Na, K, S and Ca to be segregated. Particularly, it is desirable for at least a part of the element A to be precipitated in triple points present in grain boundaries of the composite oxide. If the crystal structure of the composite oxide is constructed to meet the particular requirement, it is possible to further improve both the safety and the cycle characteristics of the secondary battery.

The composite oxide used in the present invention can be manufactured by, for example, a solid state reaction process, a coprecipitation process, or hydrothermal synthesis. Particularly, it is desirable to obtain the composite oxide having a composition represented by chemical formula (5) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. By employing the particular process, it is possible to arrange regularly the structure of the oxygen layer-Li layer-oxygen layer-(Ni+Co+Me3) layer-oxygen layer-Li layer and to permit the precipitation of the element A in triple points present in grain boundaries of the composite oxide. As a result, it is possible to further improve the safety and the charge-discharge cycle characteristics of the secondary battery.

As described above, the lithium ion secondary battery of the present invention comprising a positive electrode containing the fifth positive electrode active material permits effectively suppressing a rapid elevation of the battery temperature when a large current flows therethrough under the state of a short circuit as in the nail sticking test, making it possible to prevent in advance dangers such as rupture and ignition. It follows that the safety of the secondary battery can be markedly improved. Also, the secondary battery of the present invention makes it possible to obtain a large discharge capacity and to further improve the charge-discharge cycle characteristics and the large current discharge characteristics (discharge rate characteristics).

(Sixth Positive Electrode Active Material)

The sixth positive electrode active material contains a composite oxide having a composition represented by chemical formula (6) given below:

$$Li_x(Ni_{1-v-t}Co_vMe3_t)(O_{2-z}X_z)+A+bB \quad (6)$$

where Me3 is at least one kind of an element selected from the group consisting of Ti, V, Cr, Zr, Nb, Mo, Hf, Ta and W, X is at least one kind of a halogen element selected from the group consisting of F, Cl, Br and I, the molar ratios x, v, t and z are $0.02 \leq x \leq 1.3$, $0.005 \leq v \leq 0.5$, $0.005 \leq t \leq 0.5$, and $0.01 \leq z \leq 0.5$, A contains at least one element selected from the group consisting of Na, K and S, each of the Na content, the K content and the S content of the composite oxide falls within a range of between 600 ppm and 3,000 ppm, B consists essentially of at least one kind of the element selected from the group consisting of Si and Fe, and the content b of the element B in said composite oxide falls within a range of between 20 ppm and 500 ppm.

The molar ratio x of lithium falls within a range of between 0.02 and 1.3 as described above for the same reasons as those described previously in conjunction with the fifth positive electrode active material. It is more desirable for the molar ratio x of lithium to fall within a range of between 0.05 and 1.2.

The molar ratio t of the element Me3 falls within a range of between 0.005 and 0.5 as described above for the same reasons as those described previously in conjunction with the fifth positive electrode active material. It is more desirable for the molar ratio t of the element Me3 to fall within a range of between 0.01 and 0.35. Also, it is desirable to use the elements described previously in conjunction with the fifth positive electrode active material as the element Me3.

The composite oxide also contains Co. It is desirable for the molar ratio v of Co to fall within a range of between 0.005 and 0.5 for the same reasons as those described previously in conjunction with the fifth positive electrode active material.

The composite oxide also contains the halogen element X. It is desirable for the molar ratio z of the halogen element X to fall within a range of between 0.01 and 0.5 for the same reasons as those described previously in conjunction with the fifth positive electrode active material. It is more desirable for the molar ratio z of the halogen element X to fall within a range of between 0.02 and 0.3. Also, it is desirable to use F as the halogen element X.

Where Na is contained in the composite oxide, the Na content should fall within a range of between 600 ppm and 3,000 ppm for the same reasons as those described previously in conjunction with the first positive electrode active material. It is more desirable for the Na content to fall within a range of between 1,000 ppm and 2,500 ppm for the same reasons as those described previously in conjunction with the first positive electrode active material.

Where K is contained in the composite oxide, the K content should fall within a range of between 600 ppm and 3,000 ppm for the same reasons as those described previously in conjunction with the first positive electrode active material. It is more desirable for the K content to fall within a range of between 1,000 ppm and 2,500 ppm for the same reasons as those described previously in conjunction with the first positive electrode active material.

Where S is contained in the composite oxide, the S content should fall within a range of between 600 ppm and 3,000 ppm for the same reasons as those described previously in conjunction with the first positive electrode active material. It is more desirable for the S content to fall within a range of between 1,000 ppm and 2,500 ppm for the same reasons as those described previously in conjunction with the first positive electrode active material.

It is desirable for the element A to include Ca in addition to at least one kind of the element selected from the group consisting of Na, K and S. It is desirable for the Ca content of the composite oxide to be not higher than 500 ppm for the same reasons as those described previously in conjunction with the first positive electrode active material. It is more desirable for the Ca content to fall within a range of between 20 ppm and 500 ppm, furthermore desirably between 50 ppm and 500 ppm.

It is possible to improve sufficiently the safety of the secondary battery even if the elements A are added singly. However, it is possible to further improve the safety of the secondary battery by adding a plurality of kinds of the elements A in combination. The desirable combinations of the elements A include the combinations described previously in conjunction with the first positive electrode active material.

It is desirable for the total content "a" of the elements A in the composite oxide to fall within a range of between 600 ppm and 7000 ppm for the same reasons as those described previously in conjunction with the first positive electrode active material. It is more desirable for the total content "a" of the elements A to fall within a range of between 1000 ppm and 5000 ppm.

It is desirable for the content b of the element B in the composite oxide to fall within the range described above for the same reasons as those described previously in conjunction with the first positive electrode active material. It is more desirable for the content b of the element B to fall within a range of between 20 ppm and 250 ppm. Also, it is possible to further improve the safety and the charge-discharge cycle characteristics of the secondary battery by using Si and Fe as the element B.

In the composite oxide represented by the chemical formula (6), it is desirable for at least a part of the element A containing at least one element selected from the group consisting of Na, K, S and Ca and for at least a part of the element B containing at least one element selected from the group consisting of Si and Fe to be segregated. Particularly, it is desirable for at least a part of at least one of the element A and the element B to be precipitated in the triple point present in the boundary of the crystal grains of the composite oxide. If the crystal structure of the composite oxide is constructed to meet the particular requirement, it is possible to further improve both the safety and the cycle characteristics of the secondary battery.

The composite oxide used in the present invention can be manufactured by, for example, a solid state reaction process, a coprecipitation process, or hydrothermal synthesis. Particularly, it is desirable to obtain the composite oxide having a composition represented by chemical formula (6) by firing a powdery mixture of the compounds of each element at 450 to 550° C. for 2 to 20 hours with an oxygen gas flow, followed by further firing the mixture at 630 to 730° C. for 2 to 50 hours with an oxygen gas flow. By employing the particular method, it is possible to arrange regularly the structure of the oxygen layer-Li layer-oxygen layer-(Ni+Co+Me3) layer-oxygen layer-Li layer and to permit the precipitation of the element A and the element B in triple points present in grain boundaries of the composite oxide. As a result, it is possible to further improve the safety and the charge-discharge cycle characteristics of the secondary battery.

As described above, the lithium ion secondary battery of the present invention comprising a positive electrode containing the sixth positive electrode active material permits effectively suppressing a rapid elevation of the battery temperature when a large current flows therethrough under the state of a short circuit as in the nail sticking test, making it possible to prevent in advance dangers such as rupture and ignition. It follows that the safety of the secondary battery can be markedly improved. Also, the secondary battery of the present invention makes it possible to obtain a large discharge capacity and to further improve the charge-discharge cycle characteristics and the large current discharge characteristics (discharge rate characteristics).

Among the first to sixth positive electrode active materials described above, it is desirable to use the first to fourth positive electrode active materials because these positive electrode active materials permit improving both the safety and the cycle characteristics. Particularly, it is desirable to use the third and fourth positive electrode active materials.

The positive electrode is prepared by mixing at least one kind of the first to sixth positive electrode active materials described above, an electrical conduction aid and a binder, followed by pressing the resultant mixture against a current collector. Also, the positive electrode is prepared by suspending the positive electrode active material noted above, the electrical conduction aid and the binder in a suitable solvent, followed by coating a current collector with the resultant suspension and subsequently drying the coated suspension.

The electrical conduction aid used in the present invention includes, for example, acetylene black, carbon black and graphite.

The binder used in the present invention includes, for example, polytetrafluoro ethylene (PTFE), polyvinylidene fluoride (PVdF), ethylene-propylenediene copolymer (EPDM), and styrene-butadiene rubber (SBR).

Concerning the mixing amounts of the positive electrode active material, the electrical conduction aid and the binder, it is desirable for the mixing amount of the positive electrode active material to fall within a range of between 80% and 95% by weight, it is desirable for the mixing amount of the electrical conduction aid to fall within a range of between 3% and 20% by weight, and it is desirable for the mixing amount of the binder to fall within a range of between 2% and 7% by weight. It is possible to use a conductive substrate of a porous structure or a conductive substrate of a nonporous structure as the current collector. Also, it is possible for the current collector to be formed of, for example, aluminum, stainless steel or nickel.

2) Separator

It is possible to use, for example, a synthetic resin unwoven fabric, a polyethylene porous film, or a polypropylene porous film as the separator.

3) Negative Electrode

The negative electrode includes a material capable of absorbing (doping)/releasing (desorbing) lithium. The particular material included in the negative electrode includes, for example, a lithium metal, a Li-containing alloy capable of absorbing/desorbing lithium, a metal oxide capable of absorbing/desorbing lithium, a metal sulfide capable of absorbing/desorbing lithium, a metal nitride capable of absorbing/desorbing lithium, a chalcogen compound capable of absorbing-desorbing lithium, and a carbonaceous material capable of absorbing-desorbing lithium ions. Particularly, it is desirable to use a negative electrode containing the chalcogen compound or the carbonaceous material noted above, because the negative electrode containing the particular compound is highly safe and permits improving the cycle life of the secondary battery.

The carbonaceous material capable of absorbing/desorbing lithium ions includes, for example, coke, a carbon fiber, a vapor-grown-carbon material, graphite, a resin calcined body, a mesophase pitch based carbon fiber, and a mesophase based spherical carbon. It is desirable to use the carbonaceous materials noted above because the particular carbonaceous materials permit improving the electrode capacity.

The chalcogen compounds used in the present invention include, for example, titanium disulfide, molybdenum disulfide, niobium selenide, and tin oxide. If these chalcogen compounds are contained in the negative electrode, the battery voltage is lowered. However, since the capacity of the negative electrode is increased, it is possible to increase the capacity of the secondary battery.

The negative electrode containing the carbonaceous material can be prepared by kneading a mixture of the carbonaceous material and the binder noted above in the presence of a solvent, followed by coating a current collector with the resultant kneaded material and subsequently drying the coated material.

The binder used for preparation of the kneaded material noted above includes, for example, polytetrafluoro ethylene (PTFE), polyvinylidene fluoride (PVdF), ethylene-propylene-diene copolymer (EPDM), and styrene-butadiene rubber (SBR). Concerning the mixing amounts of the carbonaceous material and the binder, it is desirable for the mixing amount of the carbonaceous material to fall within a range of between 90% and 98% by weight, and it is desirable for the mixing amount of the binder to fall within a range of between 2% and 10% by weight. Also, it is possible to use a conductive substrate made of, for example, copper, stainless steel or nickel as the current collector. It is possible for the current collector to be either porous or nonporous.

4) Liquid Nonaqueous Electrolyte

The liquid nonaqueous electrolyte is prepared by dissolving a solute in a nonaqueous solvent. The nonaqueous solvent used in the present invention includes, for example, a cyclic carbonate, a straight chain carbonates such as ethylene carbonate, propylene carbonate, diethyl carbonate, dimethyl carbonate or methyl ethyl carbonate, a cyclic ether, a straight chain ether such as 1,2-dimethoxy ethane, or 2-methyl tetrahydro furan, a cyclic ester, and a straight chain ester such as $\gamma$-butyrolactone, $\gamma$-valerolactone, $\sigma$-valerolactone, methyl acetate, ethyl acetate, propyl acetate, isopropyl acetate, methyl propionate, ethyl propionate or propyl propionate. These nonaqueous solvents can be used singly or in the form of a mixed solvent prepared by mixing 2 to 5 kinds of the nonaqueous solvents exemplified above, though the nonaqueous solvents used in the present invention are not limited to the compounds exemplified above.

The solute used in the present invention includes, for example, lithium salts such as lithium perchlorate ($LiClO_4$), lithium hexafluoro phosphate ($LiPF_6$), lithium tetrafuluoro borate ($LiBF_4$), lithium hexafluoro arsenate ($LiAsF_6$), lithium trifluoro meta-sulfonate ($LiCF_3SO_3$), and bis-trifluoromethyl sulfonyl imide lithium [$LiN(CF_3SO_2)_2$]. These solutes can be used singly or in the form of a mixture of two or three kinds of these lithium salts, though the solutes used in the present invention for preparing the liquid nonaqueous electrolyte are not limited to the compounds exemplified above.

It is desirable for the amount of the solute dissolved in the nonaqueous solvent to fall within a range of between 0.5 and 2 mol/L.

Figure 2:
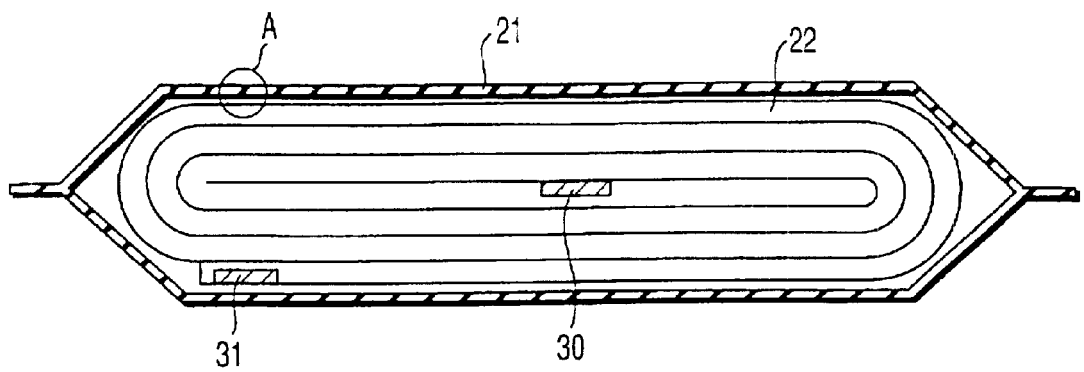
FIG. 2 is a cross-sectional view showing a thin lithium ion secondary battery as an example of a lithium ion secondary battery according to another embodiment of the present invention.
Figure 3:
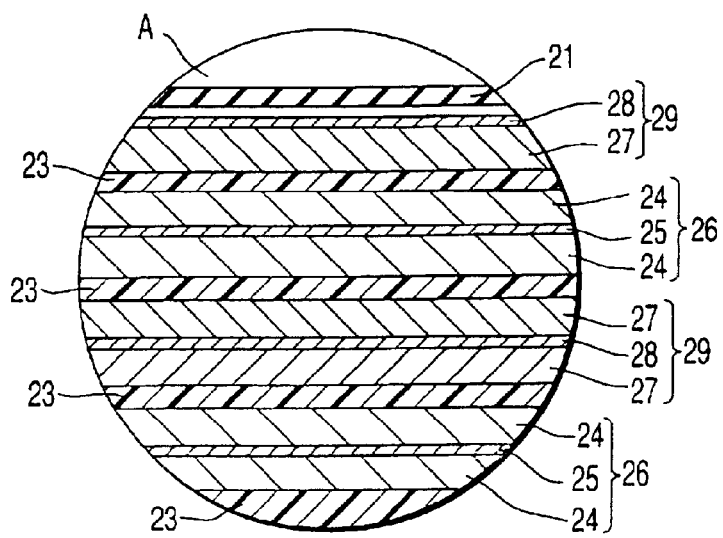
FIG. 3 is a cross-sectional view showing in a magnified fashion a portion A shown in FIG. 2.

FIGS. 1 to 3 collectively show as an example the construction of the lithium ion secondary battery of the present invention. Specifically, FIG. 1 is an oblique view, partly broken away, showing the construction of a cylindrical lithium ion secondary battery as an example of the lithium ion secondary battery of the present invention. FIG. 2 is a cross-sectional view showing a thin lithium ion secondary battery as an example of the lithium ion secondary battery of the present invention. Further, FIG. 3 is a cross-sectional view showing in a magnified fashion the portion A of the lithium ion secondary battery shown in FIG. 2.

As shown in FIG. 1, an insulating body 2 is arranged in the bottom portion of a cylindrical container 1 made of, for example, stainless steel. An electrode group 3 is arranged within the container 1. The electrode group 3 is prepared by spirally winding a band-like material prepared by laminating a positive electrode 4, a separator 5 and a negative electrode 6 in the order mentioned.

A nonaqueous electrolyte is housed in the container 1. A PTC element 7 having a hole formed in the central portion, a safety valve 8 arranged on the PTC element 7 and a hat-shaped positive electrode terminal 9 arranged on the safety valve 8 are fixed by caulking to the upper open portion of the container 1 with an insulating gasket 10 interposed therebetween. Incidentally, a safety mechanism acting as a gas releasing hole (not shown) is incorporated in the positive electrode terminal 9. A positive electrode lead 11 is connected at one end to the positive electrode 4 and to the PTC element 7 at the other end. Also, the negative electrode 6 is connected via a negative electrode lead (not shown) to the container 1 acting as a negative electrode terminal.

As shown in FIG. 2, an electrode group 22 is housed in a housing container 21 made of, for example, a film material. The film material used in the present invention includes, for example, a metal film, a resin sheet such as a thermoplastic resin sheet, and a sheet comprising a metal layer and a resin layer such as a thermoplastic resin layer formed on one surface or both surfaces of the metal layer. The electrode group 22 is prepared by winding flat a laminate structure comprising a positive electrode, a separator and a negative electrode. The laminate structure comprises a separator 23; a positive electrode 26 including a positive electrode layer 24, a positive electrode current collector 25 and a positive electrode layer 24; a separator 23; a negative electrode 29 including a negative electrode layer 27, a negative electrode current collector 28, and a negative electrode layer 27; a separator 23; a positive electrode 26 including a positive electrode layer 24, a positive electrode current collector 25 and a positive electrode layer 24; a separator 23; and a negative electrode 29 including a negative electrode layer 27, and a negative electrode current collector 28, which are laminated in the order mentioned as viewed from the lower end. The negative electrode current collector 28 is positioned to constitute the outermost circumferential surface of the electrode group 22. A band-like positive electrode lead 30 is connected at one end to the positive electrode current collector 25 and is withdrawn at the other end portion from within the housing container 21. On the other hand, a band-like negative electrode lead 31 is connected at one end portion to the negative electrode current collector 28 of the electrode group 22 and is withdrawn at the other end portion from within the housing container 21.

Some Examples of the present invention will now be described with reference to the accompanying drawings.

EXAMPLES 1 TO 26

Prepared as starting materials were powders of $LiOH.H_2O$, $Ni(OH)_2$, oxides, carbonates and nitrates of the element Me1, NaOH, KOH, $Ca(OH)_2$, sodium sulfide ($Na_2S.9H_2O$) as a sulfide compound, and a sulfate compound ($NiSO_4.6H_2O$). These powdery compounds were selected to form the composition shown in Tables 1 and 2, i.e., $Li_{1.1}(Ni_{0.88}Me1_{0.02})(O_{1.9}X_{0.1})+aA$, and mixed, followed by further mixing the composition in a Henschel mixer for 30 minutes so as to prepare a mixed powder. The mixed powder was put in an alumina sagger for firing. Firing was performed at 480° C. for 10 hours while allowing an oxygen gas to flow at a rate of 5 liter/min, followed by further firing the mixed powder at 700° C. for 20 hours with an oxygen gas flow at a rate of 5 liter/min so as to obtain a positive electrode active material.

Incidentally, the composition of the positive electrode active material was measured by glow discharge mass spectrometry (GDMS). In the GDMS method, several kilovolts (kV) of voltage is applied to one electrode used as a sample in an Ar gas atmosphere of about 1 Torr so as to form a glow discharge and to apply a sputtering to the surface of the sample. The sample ions thus formed are withdrawn through an aperture formed in the electrode and are accelerated so as to perform the mass analysis. The content of each of the elements forming the composite oxide is obtained by this glow discharge type mass spectrometry, and the content of each of the elements other than the element A is converted into the molar percentage (mol %) so as to obtain the chemical formula. The composition analysis was performed by the glow discharge mass spectrometry in the positive electrode active materials obtained in the Examples described in the following.

A positive electrode composition consisting of 92.2% by weight of the positive electrode active material, 1.8% by weight of an acetylene black, 2.2% by weight of a synthetic graphite, and 3.8% by weight of polyvinylidene fluoride was prepared by adding a lithium-containing composite oxide powder used as a positive electrode active material, and an electrical conduction agent formed of an acetylene black and a synthetic graphite in a solution prepared by dissolving polyvinylidene fluoride in N-methyl-2-pyrrolidone while stirring the system. Both surfaces of an aluminum foil having a thickness of 20 μm were coated with the positive electrode composition thus prepared, followed by drying the coating and subsequently pressing the coating by using a roller press machine.

<Preparation of Negative Electrode>

A carbonaceous material was prepared by carbonizing mesophase pitch carbon fibers, which were prepared by using mesophase pitch as the raw material, at 1,000° C. in an argon gas atmosphere, followed by appropriately pulverizing the carbonized mesophase pitch carbon fibers such that the pulverized fibers had an average fiber length of 30 μm and an average fiber diameter of 11 μm, and that the amount of the particles having a particle diameter not larger than 0.5 μm is decreased (not larger than 5%) and the particles having the particle diameters falling within a range of between 1 μm and 80 μm to occupy 90% by volume of the pulverized fibers, and subsequently graphitizing the pulverized fibers at 3,000° C. in an argon gas atmosphere.

A negative electrode composition consisting of 86.5% by weight of the carbonaceous material, 9.5% by weight of a synthetic graphite, and 4% by weight of polyvinylidene fluoride was prepared by adding the carbonaceous material thus prepared and a synthetic graphite to a solution prepared by dissolving polyvinylidene fluoride in N-methyl-2-pyrrolidone. Then, both surfaces of a copper foil having a thickness of 15 μm were coated with the negative electrode composition thus prepared, followed by drying the coating and subsequently pressing the coating by using a roller press machine so as to prepare the negative electrode. In preparing the positive electrode and the negative electrode, the loading density and the electrode length were adjusted to permit a ratio (capacity balance) of the design capacity of the negative electrode to the design capacity of the positive electrode after pressing to fall within a range of between 1.03 and 1.1.

<Preparation of Nonaqueous Electrolyte (Liquid Nonaqueous Electrolyte)>

A nonaqueous electrolyte was prepared by dissolving lithium hexafluoro phosphate ($LiPF_6$) in a mixed nonaqueous solvent prepared by mixing ethylene carbonate (EC) and methyl ethyl carbonate (MEC) at a volume ratio of 1:1.

<Assembly of Battery>

A positive electrode lead made of aluminum and a negative electrode lead made of nickel were welded to the positive electrode and the negative electrode, respectively, followed by laminating the positive electrode, a separator formed of a polyethylene porous film and the negative electrode in the order mentioned. The laminate structure thus prepared spirally wound such that the negative electrode is positioned to form the outer surface, thereby preparing an electrode group.

The electrode group thus prepared was housed in a cylindrical container having a bottom. Then, the negative electrode lead was welded to the bottom portion of the cylindrical container, and the positive electrode lead was welded to the safety valve arranged in the open portion of the cylindrical container. Further, 4 mL of the nonaqueous electrolyte was poured into the cylindrical container so as to permit the electrode group to be impregnated sufficiently with the nonaqueous electrolyte. Still further, the positive electrode terminal was arranged on the safety valve and fixed by the caulking, thereby assembling a cylindrical lithium ion secondary battery (18650 size) having a rated design capacity of 1,600 mAh.

COMPARATIVE EXAMPLES 1 TO 9

Prepared as starting materials were powders of $LiOH.H_2O$, $Ni(OH)_2$, oxides, carbonates and nitrates of the element Me1, NaOH, KOH, $Ca(OH)_2$, sodium sulfide ($Na_2S.9H_2O$) as a sulfide compound, and a sulfate compound ($NiSO_4.6H_2O$). These powdery compounds were selected to form the composition shown in Table 3 and mixed, followed by further mixing the composition in a Henschel mixer for 30 minutes so as to prepare a mixed powder. The mixed powder was put in an alumina sagger for firing. Firing was performed at 480° C. for 10 hours while allowing an oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

<Nail Sticking Test>

A nail sticking test was applied to the secondary battery prepared in each of Examples 1 to 26 and Comparative Examples 1 to 9. In the first step, the secondary battery was charged. The charging was performed to reach 4.2 V with a current value corresponding to 0.2C, which is calculated on the basis of the rated design capacity of the secondary battery, followed by maintaining the constant voltage of 4.2 V. The charging was applied for 8 hours in total. After the secondary battery was charged to 4.2 V, a safety of the secondary battery was studied by a nail sticking test. The nail used in the test had a diameter of 2 mm and the nail sticking speed was 135 mm/sec. Also, the temperature elevation of the secondary battery in the nail sticking test was measured by a thermocouple mounted on the outer surface of the secondary battery. Tables 1 to 3 show the situation in respect of the occurrence or nonoccurrence of rupture/ignition caused by the nail sticking test and the battery temperature in the nail sticking test.

<Initial Capacity and Charge-Discharge Cycle Life>

A charge-discharge cycle test was applied at room temperature to the secondary battery prepared in each of Examples 1 to 26 and Comparative Examples 1 to 9 so as to determine the discharge capacity (initial discharge capacity) after the first cycle and the reduction rate of the discharge capacity after 300 cycles. Tables 1 to 3 show the results. In the charge-discharge cycle test, the secondary battery was charged to 4.2 V under a current corresponding to 0.5C of the rated design capacity, followed by maintaining the constant voltage of 4.2 V. The charging was performed for 5 hours in total. On the other hand, the secondary battery was discharged to 2.7 V under the same current value. A rest time of 30 minutes was provided between the charging and the discharging.

<High Rate Discharge Characteristics (Discharge Rate Characteristics)>

The secondary battery prepared in each of Examples 1 to 26 and Comparative Examples 1 to 9 was charged to 4.2 V with a current corresponding to 0.5C of the rated design capacity, followed by maintaining the constant voltage of 4.2 V. The charging was performed for 5 hours in total. Then, the secondary battery was discharged 30 minutes later to 2.7 V under a current corresponding to 5C. The discharge capacity at the time when the secondary battery was discharged under a current of 5C was compared with the initial discharge capacity measured under the conditions described previously so as to determine the rate (%) in the reduced capacity at the time of the discharge at 5C relative to the initial discharge capacity, thereby obtaining the large current discharge characteristics (discharge rate characteristics). Tables 1 to 3 also show the results.

<Charge-Discharge Cycle Characteristics Under the Condition of the Large Current Discharge (High Rate Cycle)>

The secondary battery prepared in each of Examples 1 to 26 and Comparative Examples 1 to 9 was charged to 4.2 V with a current corresponding to 0.5C of the rated design capacity, followed by maintaining the constant voltage of 4.2 V. The charging was performed for 5 hours in total. Then, the secondary battery was discharged 30 minutes later to 2.7 V under a current corresponding to 5C. The discharge capacity was measured after the charge-discharge operations described above were repeated 100 times so as to determine the rate of the reduced capacity in the discharge time after 100 charge-discharge cycles relative to the initial discharge capacity, thereby obtaining the high rate cycle characteristics. Tables 1 to 3 also show the results.

TABLE 1

| | Li molar ratio x | Me1 | Molar ratio y | Halogen | Molar ratio z | A | a (ppm) | Result of nail sticking test |
|---|---|---|---|---|---|---|---|---|
| Example 1 | 1.10 | B | 0.02 | F | 0.1 | Na | 3000 | No rupture and no ignition |
| Example 2 | 1.10 | Mg | 0.02 | F | 0.1 | K | 3000 | No rupture and no ignition |
| Example 3 | 1.10 | Al | 0.02 | F | 0.1 | S | 3000 | No rupture and no ignition |
| Example 4 | 1.10 | Sc | 0.02 | F | 0.1 | Na | 2500 | No rupture and no ignition |
| Example 5 | 1.10 | V | 0.02 | F | 0.1 | K | 2500 | No rupture and no ignition |
| Example 6 | 1.10 | Cr | 0.02 | F | 0.1 | S | 2500 | No rupture and no ignition |
| Example 7 | 1.10 | Mn | 0.02 | F | 0.1 | Na | 2000 | No rupture and no ignition |
| Example 8 | 1.10 | Zn | 0.02 | Cl | 0.1 | K | 2000 | No rupture and no ignition |
| Example 9 | 1.10 | Ga | 0.02 | Cl | 0.1 | S | 2000 | No rupture and no ignition |
| Example 10 | 1.10 | Y | 0.02 | Cl | 0.1 | Na | 1500 | No rupture and no ignition |
| Example 11 | 1.10 | Zr | 0.02 | Cl | 0.1 | K | 1500 | No rupture and no ignition |
| Example 12 | 1.10 | Mo | 0.02 | Br | 0.1 | S | 1500 | No rupture and no ignition |
| Example 13 | 1.10 | Tc | 0.02 | Br | 0.1 | Na | 1000 | No rupture and no ignition |
| Example 14 | 1.10 | Ru | 0.02 | Br | 0.1 | K | 1000 | No rupture and no ignition |
| Example 15 | 1.10 | Sn | 0.02 | Br | 0.1 | S | 1000 | No rupture and no ignition |
| Example 16 | 1.10 | Hf | 0.02 | I | 0.1 | Na | 600 | No rupture and no ignition |
| Example 17 | 1.10 | W | 0.02 | I | 0.1 | K | 600 | No rupture and no ignition |
| Example 18 | 1.10 | Re | 0.02 | I | 0.1 | S | 600 | No rupture and no ignition |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 1 | 108 | 1680 | −8 | −14 | −21 |
| Example 2 | 107 | 1700 | −13 | −16 | −22 |
| Example 3 | 107 | 1750 | −9 | −15 | −21 |
| Example 4 | 108 | 1660 | −10 | −13 | −12 |
| Example 5 | 107 | 1700 | −8 | −16 | −15 |
| Example 6 | 106 | 1680 | −14 | −14 | −13 |
| Example 7 | 107 | 1690 | −9 | −15 | −14 |
| Example 8 | 107 | 1670 | −9 | −17 | −14 |
| Example 9 | 107 | 1670 | −9 | −13 | −13 |
| Example 10 | 108 | 1680 | −10 | −14 | −14 |
| Example 11 | 106 | 1680 | −15 | −16 | −14 |
| Example 12 | 107 | 1680 | −8 | −13 | −14 |
| Example 13 | 108 | 1660 | −9 | −14 | −13 |
| Example 14 | 108 | 1670 | −11 | −17 | −15 |
| Example 15 | 108 | 1680 | −8 | −13 | −14 |
| Example 16 | 107 | 1680 | −9 | −13 | −22 |
| Example 17 | 108 | 1710 | −9 | −17 | −23 |
| Example 18 | 108 | 1660 | −8 | −14 | −22 |

TABLE 2

| | Li molar ratio x | Me1 | Molar ratio y | Halogen | Molar ratio z | A | a (ppm) | Result of nail sticking test |
|---|---|---|---|---|---|---|---|---|
| Example 19 | 1.10 | Bi | 0.02 | I | 0.1 | Na | 1500 | No rupture and no ignition |
| | | | | | | Ca | 300 | |
| Example 20 | 1.10 | Ti | 0.02 | F | 0.1 | Ca | 500 | No rupture and no ignition |
| | | | | | | Na | 1500 | |
| | | | | | | S | 2000 | |
| Example 21 | 1.10 | Mn | 0.02 | F | 0.1 | S | 2200 | No rupture and no ignition |
| | | | | | | Ca | 400 | |
| | | | | | | K | 1300 | |
| Example 22 | 1.10 | Nb | 0.02 | Cl | 0.1 | Ca | 100 | No rupture and no ignition |
| | | | | | | K | 1000 | |
| | | | | | | S | 1500 | |
| Example 23 | 1.10 | Cu | 0.02 | Cl | 0.1 | Ca | 100 | No rupture and no ignition |
| | | | | | | Na | 600 | |
| Example 24 | 1.10 | Mo | 0.02 | Br | 0.1 | Na | 1500 | No rupture and no ignition |
| | | | | | | K | 1000 | |
| | | | | | | S | 2200 | |

TABLE 2-continued

| | | | | | | | | |
|---|---|---|---|---|---|---|---|---|
| Example 25 | 1.10 | Ta | 0.02 | I | 0.1 | K<br>Ca<br>S | 1000<br>50<br>1500 | No rupture and no ignition |
| Example 26 | 1.10 | La | 0.02 | F | 0.1 | Na<br>Ca | 1500<br>600 | No rupture and no ignition |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 19 | 107 | 1660 | −9 | −9 | −9 |
| Example 20 | 104 | 1730 | −5 | −9 | −9 |
| Example 21 | 104 | 1720 | −5 | −8 | −9 |
| Example 22 | 103 | 1770 | −7 | −9 | −9 |
| Example 23 | 104 | 1690 | −7 | −9 | −17 |
| Example 24 | 104 | 1700 | −9 | −14 | −13 |
| Example 25 | 103 | 1770 | −8 | −11 | −11 |
| Example 26 | 103 | 1680 | −20 | −33 | −31 |

TABLE 3

| | Li molar ratio x | Mel | Molar ratio y | Halogen | Molar ratio z | A | a (ppm) | Result of nail sticking test |
|---|---|---|---|---|---|---|---|---|
| Comparative example 1 | 1.10 | B | 0.02 | F | 0.1 | Na | 500 | No rupture and no ignition |
| Comparative example 2 | 1.10 | B | 0.02 | F | 0.1 | None | — | Occurrence of rupture and ignition |
| Comparative example 3 | 1.10 | Ta | 0.02 | F | 0.1 | S | 500 | No rupture and no ignition |
| Comparative example 4 | 1.10 | Ta | 0.02 | F | 0.1 | None | — | Occurrence of rupture and ignition |
| Comparative example 5 | 1.10 | Y | 0.02 | F | 0.1 | K | 500 | No rupture and no ignition |
| Comparative example 6 | 1.10 | Y | 0.02 | F | 0.1 | None | — | Occurrence of rupture and ignition |
| Comparative example 7 | 1.10 | Zr | 0.02 | F | 0.1 | Ca | 200 | Occurrence of rupture and ignition |
| Comparative example 8 | 1.10 | Zr | 0.02 | F | 0.1 | None | — | Occurrence of rupture and ignition |
| Comparative example 9 | 1.10 | Zr | 0.02 | F | 0.1 | Fe | 100 | Occurrence of rupture and ignition |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Comparative example 1 | 117 | 1660 | −31 | −41 | −45 |
| Comparative example 2 | 410 | 1660 | −31 | −58 | −59 |
| Comparative example 3 | 116 | 1740 | −35 | −42 | −43 |
| Comparative example 4 | 421 | 1740 | −37 | −57 | −58 |
| Comparative example 5 | 118 | 1710 | −35 | −41 | −41 |
| Comparative example 6 | 423 | 1710 | −32 | −59 | −59 |
| Comparative example 7 | 421 | 1690 | −35 | −41 | −42 |
| Comparative example 8 | 422 | 1700 | −36 | −58 | −59 |
| Comparative example 9 | 425 | 1680 | −37 | −57 | −59 |

As is apparent from Tables 1 to 3, the secondary battery for each of Examples 1 to 26 each comprising a positive electrode active material containing the composite oxide having the composition represented by chemical formula (1) referred to previously was free from rupture and ignition in the nail sticking test and was lower than the secondary batteries for Comparative Examples 1 to 9 in any of the discharge capacity reduction rate after 300 cycles, the discharge capacity reduction rate at the discharge at 5C, and the discharge capacity reduction rate in the high rate cycle in which the discharge rate was set at 5C.

Particularly, the secondary batteries for Examples 4 to 15 each comprising the positive electrode active material containing Na, K or S in an amount falling within a range of between 1,000 ppm and 2,500 ppm were found to be lower than the secondary batteries for Examples 1 to 3 and 16 to 18 in the discharge capacity reduction rate in the high rate cycle. Further, the secondary battery for Example 23 comprising a positive electrode active material containing Ca in an amount not larger than 500 ppm was found to be superior to the secondary battery for Example 16 in the high rate discharge characteristics and the high rate cycle characteristics.

On the other hand, the secondary batteries for Comparative Examples 1, 3, 5 each comprising a positive electrode active material containing 500 ppm of Na, K or S and the secondary battery for Comparative Example 7 comprising a positive electrode active material containing 200 ppm of Ca were found to be larger than the secondary batteries for Examples 1 to 26 in any of the discharge capacity reduction rate after 300 cycles, the discharge capacity reduction rate at the discharge at 5C, and the discharge capacity reduction rate at the high rate cycle time in which the discharge rate was set at 5C.

Figure 4:
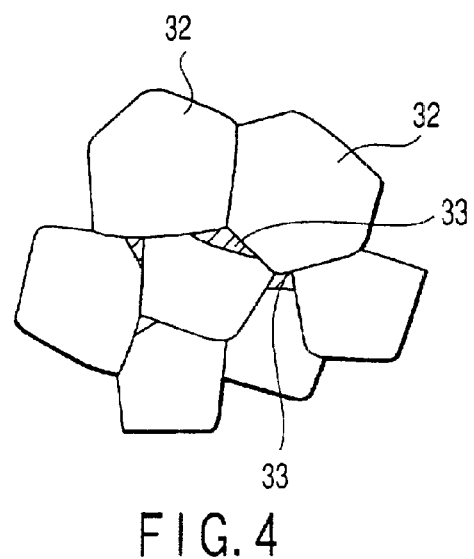
FIG. 4 schematically shows the crystal structure of a lithium-containing composite oxide, which is contained in the lithium ion secondary battery for Example 1 of the present invention.

Incidentally, a transmission electron microscopic observation was applied to the lithium-containing composite oxide used in the secondary battery for Example 1. It has been confirmed that, as shown in FIG. 4, Na metal was precipitated in triple points 33 (shaded regions) positioned in the boundaries among crystal grains 32.

EXAMPLES 27 TO 49

Prepared as starting materials were powders of $LiOH \cdot H_2O$, $Ni(OH)_2$, oxides, carbonates and nitrates of the element Me1, NaOH, KOH, $Ca(OH)_2$, sodium sulfide $(Na_2S \cdot 9H_2O)$ as a sulfide compound, a sulfate compound $(NiSO_4 \cdot 6H_2O)$, an oxide, a sulfide and alkoxide of Si, and an oxide, a sulfide and an alkoxide of Fe. These powdery compounds were selected to form the composition shown in Tables 4 and 5, i.e., $Li_{1.1}(Ni_{0.88}Me1_{0.02})(O_{1.9}X_{0.1})+aA+bB$, and mixed, followed by further mixing the composition in a Henschel mixer for 30 minutes so as to prepare a mixed powder. The mixed powder was put in an alumina sagger for firing. Firing was performed at 480° C. for 10 hours while allowing oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

For the secondary battery prepared in each of Examples 27 to 49, measured were the occurrence or nonoccurrence of rupture and ignition by a nail sticking test, the battery temperature by the nail sticking test, the discharge capacity after the first cycle (initial discharge capacity), the reduction rate of the discharge capacity after 300 cycles, the discharge capacity reduction rate at the discharge at 5C, and the discharge capacity reduction rate at the high rate cycle in which the discharge rate was set at 5C as in Example 1. Tables 4 and 5 show the results.

TABLE 4

| | Li molar ratio x | Me1 | Molar ratio y | Halogen | Molar ratio z | A | a (ppm) | B | b (ppm) | Result of nail sticking test |
|---|---|---|---|---|---|---|---|---|---|---|
| Example 27 | 1.10 | B | 0.02 | F | 0.1 | Na | 3000 | Fe | 400 | No rupture and no ignition |
| Example 28 | 1.10 | Mg | 0.02 | F | 0.1 | K | 3000 | Si | 50 | No rupture and no ignition |
| Example 29 | 1.10 | Al | 0.02 | F | 0.1 | S | 3000 | Fe | 300 | No rupture and no ignition |
| Example 30 | 1.10 | V | 0.02 | F | 0.1 | Na | 2500 | Si | 200 | No rupture and no ignition |
| Example 31 | 1.10 | Cr | 0.02 | F | 0.1 | K | 2500 | Fe | 100 | No rupture and no ignition |
| Example 32 | 1.10 | Mn | 0.02 | F | 0.1 | S | 2500 | Si | 300 | No rupture and no ignition |
| Example 33 | 1.10 | Ti | 0.02 | F | 0.1 | Na | 2000 | Fe | 100 | No rupture and no ignition |
| Example 34 | 1.10 | Co | 0.02 | F | 0.1 | K | 2000 | Fe | 50 | No rupture and no ignition |
| Example 35 | 1.10 | Cu | 0.02 | Cl | 0.1 | S | 2000 | Si | 400 | No rupture and no ignition |
| Example 36 | 1.10 | Zn | 0.02 | F | 0.1 | Na | 1000 | Fe | 350 | No rupture and no ignition |
| Example 37 | 1.10 | Ga | 0.02 | Cl | 0.1 | K | 1000 | Si | 50 | No rupture and no ignition |
| Example 38 | 1.10 | Y | 0.02 | Cl | 0.1 | S | 1000 | Fe | 300 | No rupture and no ignition |
| Example 39 | 1.10 | Zr | 0.02 | Cl | 0.1 | Na | 600 | Si | 100 | No rupture and no ignition |
| Example 40 | 1.10 | Nb | 0.02 | Cl | 0.1 | K | 600 | Fe | 200 | No rupture and no ignition |
| Example 41 | 1.10 | Mo | 0.02 | Br | 0.1 | S | 600 | Si | 200 | No rupture and no ignition |
| Example 42 | 1.10 | Tc | 0.02 | Br | 0.1 | Na | 1100 | Fe | 100 | No rupture and no ignition |
| | | | | | | Ca | 200 | | | |
| Example 43 | 1.10 | Ru | 0.02 | Br | 0.1 | S | 1000 | Si | 300 | No rupture and no ignition |
| | | | | | | Ca | 200 | | | |
| Example 44 | 1.10 | Sn | 0.02 | Br | 0.1 | K | 2800 | Fe | 50 | No rupture and no ignition |
| | | | | | | Ca | 200 | | | |

TABLE 4-continued

|  | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 27 | 95 | 1680 | −8 | −13 | −22 |
| Example 28 | 95 | 1710 | −15 | −16 | −21 |
| Example 29 | 96 | 1770 | −8 | −14 | −22 |
| Example 30 | 96 | 1730 | −8 | −13 | −13 |
| Example 31 | 95 | 1700 | −17 | −15 | −14 |
| Example 32 | 95 | 1710 | −9 | −13 | −13 |
| Example 33 | 96 | 1700 | −10 | −14 | −14 |
| Example 34 | 96 | 1690 | −13 | −16 | −15 |
| Example 35 | 97 | 1690 | −13 | −14 | −13 |
| Example 36 | 97 | 1700 | −15 | −13 | −13 |
| Example 37 | 96 | 1700 | −10 | −17 | −14 |
| Example 38 | 98 | 1700 | −16 | −13 | −13 |
| Example 39 | 97 | 1770 | −11 | −16 | −20 |
| Example 40 | 96 | 1750 | −10 | −14 | −22 |
| Example 41 | 96 | 1680 | −9 | −13 | −21 |
| Example 42 | 95 | 1690 | −9 | −9 | −9 |
| Example 43 | 95 | 1700 | −17 | −8 | −9 |
| Example 44 | 96 | 1700 | −12 | −9 | −17 |

TABLE 5

|  | Li molar ratio x | Mel | Molar ratio y | Halogen | Molar ratio Z | A | a (ppm) | B | b (ppm) | Result of nail sticking test |
|---|---|---|---|---|---|---|---|---|---|---|
| Example 45 | 1.10 | Ta | 0.02 | I | 0.1 | Na<br>S<br>Ca | 1500<br>1000<br>100 | Si | 100 | No rupture and no ignition |
| Example 46 | 1.10 | Mg | 0.02 | F | 0.1 | K<br>Ca | 600<br>200 | Si<br>Fe | 50<br>50 | No rupture and no ignition |
| Example 47 | 1.10 | Ti | 0.02 | F | 0.1 | S<br>Na | 1000<br>1000 | Fe<br>Si | 200<br>70 | No rupture and no ignition |
| Example 48 | 1.10 | Nb | 0.02 | Cl | 0.1 | S<br>K | 1500<br>1200 | Fe<br>Si | 200<br>60 | No rupture and no ignition |
| Example 49 | 1.10 | Mo | 0.02 | Br | 0.1 | Na<br>S | 2000<br>1000 | Si<br>Fe | 200<br>100 | No rupture and no ignition |

|  | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 45 | 96 | 1730 | −9 | −8 | −9 |
| Example 46 | 90 | 1730 | −8 | −13 | −16 |
| Example 47 | 91 | 1760 | −5 | −13 | −13 |
| Example 48 | 90 | 1780 | −8 | −14 | −13 |
| Example 49 | 91 | 1710 | −6 | −13 | −13 |

As is apparent from Tables 4 and 5, the secondary battery for each of Examples 27 to 49 each comprising a positive electrode active material containing the composite oxide having the composition represented by chemical formula (2) referred to previously was free from rupture and ignition in the nail sticking test and was lower than the secondary batteries for Comparative Examples 1 to 8 in any of the discharge capacity reduction rate after 300 cycles, the discharge capacity reduction rate at the discharge at 5C, and the discharge capacity reduction rate in the high rate cycle in which the discharge rate was set at 5C. Further, the secondary batteries for Examples 27 to 49 were lower than the secondary batteries for Examples 1 to 26 in the battery temperature in the step of the nail sticking test.

Particularly, the secondary batteries for Examples 30 to 38 each comprising the positive electrode active material containing Na, K or S in an amount falling within a range of between 1,000 ppm and 2,500 ppm were found to be lower than the secondary batteries for Examples 27 to 29 and 39 to 41 in the discharge capacity reduction rate in the high rate cycle. Further, the secondary batteries for Examples 42 to 46 each comprising a positive electrode active material containing Ca in an amount not larger than 500 ppm were found to be superior to the secondary battery in which Ca was not added to the positive electrode active material in the high rate discharge characteristics and the high rate cycle characteristics.

EXAMPLES 50 TO 69 AND COMPARATIVE EXAMPLES 10 TO 13

Prepared as starting materials were powders of $LiOH \cdot H_2O$, $Ni(OH)_2$, $Co(OH)_2$, oxides, carbonates and nitrates of the element Me2, NaOH, KOH, $Ca(OH)_2$, sodium sulfide ($Na_2S \cdot 9H_2O$) as a sulfide compound, and a sulfate compound ($NiSO_4 \cdot 6H_2O$). These powdery compounds were selected to form the composition shown in Tables 6 and 7, i.e., $Li_{1.1}(Ni_{0.70}Co_{0.18}Me2_{0.02})(O_{1.9}X_{0.1})+aA$, and mixed, followed by further mixing the composition in a Henschel mixer for 30 minutes so as to prepare a mixed powder. The mixed powder was put in an alumina sagger for firing. Firing was performed at 480° C. for 10 hours while allowing oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

For the secondary battery prepared in each of Examples 50 to 69 and Comparative Examples 10 to 13, measured were the occurrence or nonoccurrence of rupture and ignition by a nail sticking test, the battery temperature by the nail sticking test, the discharge capacity after the first cycle (initial discharge capacity), the reduction rate of the discharge capacity after 300 cycles, the discharge capacity reduction rate at the discharge at 5C, and the discharge capacity reduction rate at the high rate cycle in which the discharge rate was set at 5C as in Example 1. Tables 6 and 7 show the results.

TABLE 6

| | Li molar ratio x | Co molar ratio v | Me2 | Molar ratio s | Halogen | Molar ratio z | A | a (ppm) | Result of nail sticking test |
|---|---|---|---|---|---|---|---|---|---|
| Example 50 | 1.10 | 0.18 | B | 0.02 | F | 0.1 | Na | 3000 | No rupture and no ignition |
| Example 51 | 1.10 | 0.18 | Mg | 0.02 | F | 0.1 | K | 1500 | No rupture and no ignition |
| Example 52 | 1.10 | 0.18 | Al | 0.02 | F | 0.1 | S | 2500 | No rupture and no ignition |
| Example 53 | 1.10 | 0.18 | Sc | 0.02 | F | 0.1 | K | 1000 | No rupture and no ignition |
| Example 54 | 1.10 | 0.18 | Mn | 0.02 | F | 0.1 | S | 3000 | No rupture and no ignition |
| Example 55 | 1.10 | 0.18 | Cu | 0.02 | Cl | 0.1 | Na Ca | 1500 300 | No rupture and no ignition |
| Example 56 | 1.10 | 0.18 | Zn | 0.02 | Cl | 0.1 | Na | 1000 | No rupture and no ignition |
| Example 57 | 1.10 | 0.18 | Ga | 0.02 | Cl | 0.1 | K | 3000 | No rupture and no ignition |
| Example 58 | 1.10 | 0.18 | Y | 0.02 | Cl | 0.1 | S | 1700 | No rupture and no ignition |
| Example 59 | 1.10 | 0.18 | Tc | 0.02 | Br | 0.1 | Na | 600 | No rupture and no ignition |
| Example 60 | 1.10 | 0.18 | Ru | 0.02 | Br | 0.1 | S | 1200 | No rupture and no ignition |
| Example 61 | 1.10 | 0.18 | Sn | 0.02 | Br | 0.1 | S | 600 | No rupture and no ignition |
| Example 62 | 1.10 | 0.18 | La | 0.02 | I | 0.1 | S Ca | 1500 100 | No rupture and no ignition |
| Example 63 | 1.10 | 0.18 | Re | 0.02 | I | 0.1 | K | 600 | No rupture and no ignition |
| Example 64 | 1.10 | 0.18 | Pb | 0.02 | I | 0.1 | K Ca | 1000 200 | No rupture and no ignition |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 50 | 86 | 1580 | −8 | −13 | −22 |
| Example 51 | 86 | 1560 | −15 | −16 | −15 |
| Example 52 | 86 | 1600 | −9 | −13 | −14 |
| Example 53 | 87 | 1560 | −14 | −15 | −15 |
| Example 54 | 86 | 1570 | −8 | −13 | −21 |
| Example 55 | 90 | 1560 | −12 | −9 | −9 |
| Example 56 | 90 | 1550 | −8 | −14 | −13 |
| Example 57 | 91 | 1560 | −15 | −16 | −22 |
| Example 58 | 92 | 1610 | −9 | −14 | −14 |
| Example 59 | 90 | 1550 | −14 | −13 | −20 |
| Example 60 | 92 | 1550 | −8 | −13 | −13 |
| Example 61 | 93 | 1580 | −14 | −14 | −21 |
| Example 62 | 91 | 1600 | −11 | −9 | −8 |
| Example 63 | 91 | 1570 | −13 | −15 | −20 |
| Example 64 | 92 | 1560 | −11 | −9 | −9 |

TABLE 7

| | Li molar ratio x | Co molar ratio y | Me2 | Molar ratio s | Halogen | Molar ratio z | A | a (ppm) | Result of nail sticking test | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|---|---|---|---|---|---|---|---|---|
| Example 65 | 1.10 | 0.18 | B | 0.02 | F | 0.1 | Na<br>S<br>Ca | 2000<br>800<br>200 | No rupture and no ignition | 81 | 1570 | −5 | −9 | −8 |
| Example 66 | 1.10 | 0.18 | Mg | 0.02 | F | 0.1 | K<br>Ca<br>Na<br>S | 1500<br>100<br>1500<br>1100 | No rupture and no ignition | 81 | 1580 | −6 | −8 | −9 |
| Example 67 | 1.10 | 0.18 | Al | 0.02 | F | 0.1 | S<br>Na<br>Ca | 2500<br>1500<br>100 | No rupture and no ignition | 80 | 1630 | −5 | −9 | −9 |
| Example 68 | 1.10 | 0.18 | Cu | 0.02 | Cl | 0.1 | Ca<br>S<br>K | 300<br>1800<br>1200 | No rupture and no ignition | 83 | 1580 | −7 | −8 | −9 |
| Example 69 | 1.10 | 0.18 | Tc | 0.02 | Br | 0.1 | K<br>S<br>Na | 1000<br>1700<br>1500 | No rupture and no ignition | 84 | 1570 | −7 | −8 | −8 |
| Comparative example 10 | 1.10 | 0.18 | B | 0.02 | F | 0.1 | none | — | Occurrence of rupture and ignition | 410 | 1560 | −31 | −58 | −60 |
| Comparative example 11 | 1.10 | 0.18 | Cu | 0.02 | Cl | 0.1 | none | — | Occurrence of rupture and ignition | 423 | 1540 | −30 | −59 | −61 |
| Comparative example 12 | 1.10 | 0.18 | Sn | 0.02 | Br | 0.1 | none | — | Occurrence of rupture and ignition | 425 | 1560 | −38 | −57 | −61 |
| Comparative example 13 | 1.10 | 0.18 | La | 0.02 | I | 0.1 | none | — | Occurrence of rupture and ignition | 431 | 1580 | −35 | −58 | −60 |

As is apparent from Tables 6 and 7, the secondary battery for each of Examples 50 to 69 each comprising a positive electrode active material containing the composite oxide having the composition represented by chemical formula (3) referred to previously was free from rupture and ignition in the nail sticking test and was lower than the secondary batteries for Comparative Examples 1 to 13 in any of the discharge capacity reduction rate after 300 cycles, the discharge capacity reduction rate at the discharge at 5C, and the discharge capacity reduction rate in the high rate cycle in which the discharge rate was set at 5C.

Particularly, the secondary batteries for Examples 51 to 53, 56, 58 and 60 each comprising the positive electrode active material containing Na, K or S in an amount falling within a range of between 1,000 ppm and 2,500 ppm were found to be lower than the secondary batteries for Examples 50, 54, 57, 59, 61 and 63, in which the content of Na, K or S did not fall within the range of between 1,000 ppm and 2,500 ppm, in the discharge capacity reduction rate at the time of the high rate cycle in which the discharge rate was set at 5C. Further, the secondary battery for Example 64 comprising a positive electrode active material containing Ca in an amount not larger than 500 ppm was found to be superior to the secondary battery in which Ca was not added to the positive electrode active material in the high rate discharge characteristics and the high rate cycle characteristics.

EXAMPLES 70 TO 89

Prepared as starting materials were powders of LiOH.H$_2$O, Ni(OH)$_2$, Co(OH)$_2$, oxides, carbonates and nitrates of the element Me2, NaOH, KOH, Ca(OH)$_2$, sodium sulfide (Na$_2$S.9H$_2$O) as a sulfide compound, a sulfate compound (NiSO$_4$.6H$_2$O), an oxide, a sulfide and an alkoxide of Si, and an oxide, a sulfide and an alkoxide of Fe. These powdery compounds were selected to form the composition shown in Tables 8 and 9, i.e., Li$_{1.1}$(Ni$_{0.70}$Co$_{0.18}$Me2$_{0.02}$)(O$_{1.9}$X$_{0.1}$)+aA+bB, and mixed, followed by further mixing the composition in a Henschel mixer for 30 minutes so as to prepare a mixed powder. The mixed powder was put in an alumina sagger for firing. Firing was performed at 480° C. for 10 hours while allowing oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

For the secondary battery prepared in each of Examples 70 to 89, measured were the occurrence or nonoccurrence of rupture and ignition by a nail sticking test, the battery temperature by the nail sticking test, the discharge capacity after the first cycle (initial discharge capacity), the reduction rate of the discharge capacity after 300 cycles, the discharge capacity reduction rate at the discharge at 5C, and the discharge capacity reduction rate at the high rate cycle in which the discharge rate was set at 5C as in Example 1. Tables 8 and 9 show the results.

TABLE 8

| | Li molar ratio x | Co molar ratio v | Me2 | Molar ratio s | Halogen | Molar ratio z | A | a (ppm) | B | b (ppm) | Result of nail sticking test |
|---|---|---|---|---|---|---|---|---|---|---|---|
| Example 70 | 1.10 | 0.18 | B | 0.02 | F | 0.1 | Na | 3000 | Fe | 400 | No rupture and no ignition |
| Example 71 | 1.10 | 0.18 | Mg | 0.02 | F | 0.1 | K | 1500 | Si | 50 | No rupture and no ignition |
| Example 72 | 1.10 | 0.18 | Al | 0.02 | F | 0.1 | S | 2500 | Fe | 300 | No rupture and no ignition |
| Example 73 | 1.10 | 0.18 | Sc | 0.02 | F | 0.1 | K | 600 | Si | 100 | No rupture and no ignition |
| Example 74 | 1.10 | 0.18 | Mn | 0.02 | F | 0.1 | S | 2200 | Fe | 200 | No rupture and no ignition |
| Example 75 | 1.10 | 0.18 | Cu | 0.02 | Cl | 0.1 | K<br>Ca | 1000<br>300 | Si | 200 | No rupture and no ignition |
| Example 76 | 1.10 | 0.18 | Zn | 0.02 | Cl | 0.1 | Na | 1000 | Fe | 100 | No rupture and no ignition |
| Example 77 | 1.10 | 0.18 | Ga | 0.02 | Cl | 0.1 | K | 3000 | Si | 300 | No rupture and no ignition |
| Example 78 | 1.10 | 0.18 | Y | 0.02 | Cl | 0.1 | S | 3000 | Fe | 50 | No rupture and no ignition |
| Example 79 | 1.10 | 0.18 | Tc | 0.02 | Br | 0.1 | Na | 2500 | Si | 400 | No rupture and no ignition |
| Example 80 | 1.10 | 0.18 | Ru | 0.02 | Br | 0.1 | S | 1200 | Fe | 400 | No rupture and no ignition |
| Example 81 | 1.10 | 0.18 | Sn | 0.02 | Br | 0.1 | K | 2100 | Si | 50 | No rupture and no ignition |
| Example 82 | 1.10 | 0.18 | La | 0.02 | I | 0.1 | Na<br>Ca | 1500<br>200 | Fe | 300 | No rupture and no ignition |
| Example 83 | 1.10 | 0.18 | Re | 0.02 | I | 0.1 | S | 600 | Si | 100 | No rupture and no ignition |
| Example 84 | 1.10 | 0.18 | Pb | 0.02 | I | 0.1 | S<br>Ca | 1500<br>150 | Fe | 200 | No rupture and no ignition |
| Example 85 | 1.10 | 0.18 | Bi | 0.02 | I | 0.1 | Na | 600 | Si | 200 | No rupture and no ignition |

| | Battery temperature [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 70 | 82 | 1600 | −8 | −13 | −21 |
| Example 71 | 82 | 1570 | −15 | −16 | −15 |
| Example 72 | 83 | 1620 | −9 | −14 | −14 |
| Example 73 | 83 | 1580 | −14 | −16 | −21 |
| Example 74 | 82 | 1590 | −8 | −13 | −14 |
| Example 75 | 86 | 1570 | −12 | −9 | −9 |
| Example 76 | 86 | 1570 | −8 | −13 | −13 |
| Example 77 | 87 | 1580 | −15 | −15 | −22 |
| Example 78 | 86 | 1640 | −9 | −13 | −20 |
| Example 79 | 86 | 1580 | −9 | −13 | −13 |
| Example 80 | 87 | 1570 | −8 | −14 | −13 |
| Example 81 | 87 | 1600 | −13 | −15 | −15 |
| Example 82 | 87 | 1620 | −11 | −9 | −9 |
| Example 83 | 87 | 1590 | −10 | −14 | −21 |
| Example 84 | 86 | 1570 | −10 | −9 | −9 |
| Example 85 | 86 | 1570 | −8 | −14 | −21 |

TABLE 9

| | Li molar ratio x | Co molar ratio v | Me2 | Molar ratio s | Halogen | Molar ratio z | A | a (ppm) | B | b (ppm) | Result of nail sticking test |
|---|---|---|---|---|---|---|---|---|---|---|---|
| Example 86 | 1.10 | 0.18 | B | 0.02 | F | 0.1 | Na<br>S<br>Ca | 2000<br>1500<br>250 | Si<br>Fe<br>— | 400<br>60<br>— | No rupture and no ignition |
| Example 87 | 1.10 | 0.18 | Mg | 0.02 | F | 0.1 | K<br>S<br>Ca | 1500<br>1200<br>150 | Si<br>Fe<br>— | 50<br>400<br>— | Non rupture and no ignition |
| Example 88 | 1.10 | 0.18 | Al | 0.02 | F | 0.1 | S<br>Na<br>K | 2500<br>1200<br>1000 | Fe<br>Si<br>— | 300<br>70<br>— | No rupture and no ignition |
| Example 89 | 1.10 | 0.18 | Sn | 0.02 | Br | 0.1 | K<br>S | 1000<br>1200 | Si<br>Fe | 50<br>400 | no rupture and no ignition |
| Comparative example 10 | 1.10 | 0.18 | B | 0.02 | F | 0.1 | none | — | none | — | Occurrence of rupture and ignition |
| Comparative example 11 | 1.10 | 0.18 | Cu | 0.02 | Cl | 0.1 | none | — | none | — | Occurrence of rupture and ignition |
| Comparative example 12 | 1.10 | 0.18 | Sn | 0.02 | Br | 0.1 | none | — | none | — | Occurrence of rupture and ignition |
| Comparative example 13 | 1.10 | 0.18 | La | 0.02 | I | 0.1 | none | — | none | — | Occurrence of rupture and ignition |

TABLE 9-continued

|  | Battery temperature [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 86 | 80 | 1590 | −5 | −8 | −9 |
| Example 87 | 76 | 1600 | −6 | −8 | −8 |
| Example 88 | 78 | 1650 | −5 | −13 | −13 |
| Example 89 | 81 | 1620 | −7 | −14 | −14 |
| Comparative example 10 | 410 | 1560 | −31 | −58 | −60 |
| Comparative example 11 | 423 | 1540 | −30 | −59 | −61 |
| Comparative example 12 | 425 | 1560 | −38 | −57 | −61 |
| Comparative example 13 | 431 | 1580 | −35 | −58 | −60 |

As is apparent from Tables 8 and 9, the secondary battery for each of Examples 70 to 89 each comprising a positive electrode active material containing the composite oxide having the composition represented by chemical formula (4) referred to previously was free from rupture and ignition in the nail sticking test and was lower than the secondary batteries for Comparative Examples 1 to 13 in any of the discharge capacity reduction rate after 300 cycles, the discharge capacity reduction rate at the discharge at 5C, and the discharge capacity reduction rate in the high rate cycle in which the discharge rate was set at 5C.

Particularly, the secondary batteries for Examples 71, 72, 74, 76 and 79 to 81 each comprising the positive electrode active material containing Na, K or S in an amount falling within a range of between 1,000 ppm and 2,500 ppm were found to be lower than the secondary batteries for Examples 70, 73, 77, 78, 83 and 85, in which the content of Na, K or S did not fall within the range of between 1,000 ppm and 2,500 ppm, in the discharge capacity reduction rate at the time of the high rate cycle in which the discharge rate was set at 5C. Further, the secondary batteries for Examples 75, 82, 84, 86 and 87 each comprising a positive electrode active material containing Ca in an amount not larger than 500 ppm were found to be capable of markedly improving the high rate discharge characteristics and the high rate cycle characteristics.

EXAMPLES 90 TO 105

Prepared as starting materials were powders of $LiOH \cdot H_2O$, $Ni(OH)_2$, $Co(OH)_2$, oxides, carbonates and nitrates of the element Me3, NaOH, KOH, $Ca(OH)_2$, sodium sulfide ($Na_2S \cdot 9H_2O$) as a sulfide compound, and a sulfate compound ($NiSO_4 \cdot 6H_2O$). These powdery compounds were selected to form the composition shown in Tables 10 and 11, i.e., $Li_{1.1}(Ni_{0.70}Co_{0.18}Me3_{0.02})(O_{1.9}X_{0.1})+aA$, and mixed, followed by further mixing the composition in a Henschel mixer for 30 minutes so as to prepare a mixed powder. The mixed powder was put in an alumina sagger for firing. Firing was performed at 480° C. for 10 hours while allowing oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

For the secondary battery prepared in each of Examples 90 to 105, measured were the occurrence or nonoccurrence of rupture and ignition by a nail sticking test, the battery temperature by the nail sticking test, the discharge capacity after the first cycle (initial discharge capacity), the reduction rate of the discharge capacity after 300 cycles, the discharge capacity reduction rate at the discharge at 5C, and the discharge capacity reduction rate at the high rate cycle in which the discharge rate was set at 5C as in Example 1. Tables 10 and 11 show the results.

TABLE 10

|  | Li molar ratio x | Co molar ratio v | Me3 | Molar ratio t | Halogen | Molar ratio z | A | a (ppm) | Result of nail sticking test |
|---|---|---|---|---|---|---|---|---|---|
| Example 90 | 1.10 | 0.18 | Ti | 0.02 | F | 0.1 | S<br>Ca | 1500<br>200 | No rupture and no ignition |
| Example 91 | 1.10 | 0.18 | V | 0.02 | F | 0.1 | Na | 1500 | No rupture and no ignition |
| Example 92 | 1.10 | 0.18 | Cr | 0.02 | F | 0.1 | K | 1000 | No rupture and no ignition |
| Example 93 | 1.10 | 0.18 | Zr | 0.02 | Cl | 0.1 | S | 2500 | No rupture and no ignition |
| Example 94 | 1.10 | 0.18 | Nb | 0.02 | Cl | 0.1 | Na<br>Ca | 1500<br>200 | No rupture and no ignition |
| Example 95 | 1.10 | 0.18 | Mo | 0.02 | Br | 0.1 | Na | 2500 | No rupture and no ignition |
| Example 96 | 1.10 | 0.18 | Hf | 0.02 | Br | 0.1 | Na | 600 | No rupture and no ignition |
| Example 97 | 1.10 | 0.18 | Ta | 0.02 | I | 0.1 | K | 600 | No rupture and no ignition |
| Example 98 | 1.10 | 0.18 | W | 0.02 | I | 0.1 | S | 600 | No rupture and no ignition |

TABLE 10-continued

| | | | | | | | | | |
|---|---|---|---|---|---|---|---|---|---|
| Example 99 | 1.10 | 0.18 | Ti | 0.02 | F | 0.1 | Ca | 200 | No rupture and no ignition |
| | | | | | | | Na | 1200 | |
| | | | | | | | S | 1500 | |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 90 | 79 | 1720 | −11 | −9 | −9 |
| Example 91 | 79 | 1700 | −8 | −13 | −14 |
| Example 92 | 79 | 1680 | −16 | −15 | −19 |
| Example 93 | 82 | 1680 | −9 | −14 | −13 |
| Example 94 | 83 | 1750 | −12 | −9 | −8 |
| Example 95 | 83 | 1680 | −8 | −13 | −14 |
| Example 96 | 83 | 1680 | −8 | −13 | −20 |
| Example 97 | 84 | 1750 | −17 | −16 | −20 |
| Example 98 | 83 | 1710 | −9 | −14 | −20 |
| Example 99 | 68 | 1720 | −5 | −9 | −9 |

TABLE 11

| | Li molar ratio x | Co molar ratio y | Me3 | Molar ratio t | Halogen | Molar ratio z | A | a (ppm) | Result of nail sticking test |
|---|---|---|---|---|---|---|---|---|---|
| Example 100 | 1.10 | 0.18 | V | 0.02 | F | 0.1 | Na | 1500 | No rupture and no ignition |
| | | | | | | | Ca | 100 | |
| | | | | | | | S | 1500 | |
| Example 101 | 1.10 | 0.18 | Cr | 0.02 | F | 0.1 | K | 1000 | No rupture and no ignition |
| | | | | | | | Na | 2000 | |
| | | | | | | | S | 1500 | |
| Example 102 | 1.10 | 0.18 | Zr | 0.02 | Cl | 0.1 | S | 3000 | No rupture and no ignition |
| | | | | | | | Na | 1000 | |
| Example 103 | 1.10 | 0.18 | Nb | 0.02 | Cl | 0.1 | Ca | 200 | No rupture and no ignition |
| | | | | | | | K | 1500 | |
| | | | | | | | S | 1000 | |
| Example 104 | 1.10 | 0.18 | Mo | 0.02 | Br | 0.1 | Na | 3000 | No rupture and no ignition |
| | | | | | | | K | 1100 | |
| | | | | | | | S | 1000 | |
| Example 105 | 1.10 | 0.18 | Ta | 0.02 | I | 0.1 | K | 1000 | No rupture and no ignition |
| | | | | | | | Ca | 150 | |
| | | | | | | | Na | 1500 | |

| | Battery temperature during nail sticking test [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 100 | 70 | 1700 | −5 | −9 | −8 |
| Example 101 | 70 | 1680 | −5 | −13 | −13 |
| Example 102 | 72 | 1680 | −5 | −13 | −22 |
| Example 103 | 73 | 1750 | −8 | −8 | −9 |
| Example 104 | 73 | 1680 | −5 | −14 | −21 |
| Example 105 | 76 | 1750 | −7 | −9 | −9 |

As is apparent from Tables 10 and 11, the secondary battery for each of Examples 90 to 105 each comprising a positive electrode active material containing the composite oxide having the composition represented by chemical formula (5) referred to previously was free from rupture and ignition in the nail sticking test and was lower than the secondary batteries for Comparative Examples 1 to 13 in any of the discharge capacity reduction rate after 300 cycles, the discharge capacity reduction rate at the discharge at 5C, and the discharge capacity reduction rate in the high rate cycle in which the discharge rate was set at 5C.

Particularly, the secondary batteries for Examples 91 to 93 and 95 each comprising the positive electrode active material containing Na, K or S in an amount falling within a range of between 1,000 ppm and 2,500 ppm were found to be lower than the secondary batteries for Examples 96 to 98, in which the content of Na, K or S did not fall within the range of between 1,000 ppm and 2,500 ppm, in the discharge capacity reduction rate at the time of the high rate cycle in which the discharge rate was set at 5C. Further, the secondary batteries for Examples 90, 94, 99, 100, 103, and 105 each comprising a positive electrode active material containing Ca in an amount not larger than 500 ppm was found to be capable of suppressing each of the capacity reduction rate at the time of the high rate discharge and the discharge capacity reduction rate at the time of the high rate cycle to a level not higher than 10%.

EXAMPLES 106 TO 120

Prepared as starting materials were powders of $LiOH \cdot H_2O$, $Ni(OH)_2$, $Co(OH)_2$, oxides, carbonates and nitrates of the element Me3, NaOH, KOH, $Ca(OH)_2$, sodium sulfide ($Na_2S \cdot 9H_2O$) as a sulfide compound, a sulfate compound ($NiSO_4 \cdot 6H_2O$), an oxide, a sulfide and an alkoxide of Si, and an oxide, a sulfide and an alkoxide of Fe. These powdery compounds were selected to form the composition shown in Tables 12 and 13, i.e., $Li_{1.1}(Ni_{0.70}Co_{0.18}Me3_{0.02})(O_{1.9}X_{0.1})+aA+bB$, and mixed, followed by further mixing the composition in a Henschel mixer for 30 minutes so as to prepare a mixed powder. The mixed powder was put in an alumina sagger for firing. Firing was performed at 480° C. for 10 hours while allowing oxygen gas to flow at a rate of 5 liter/min, followed by further firing the mixed powder at 700° C. for 20 hours with an oxygen gas flow at a rate of 5 liter/min so as to obtain a positive electrode active material.

A cylindrical lithium ion secondary battery was prepared as in Example 1, except that the positive electrode active material thus prepared was used.

For the secondary battery prepared in each of Examples 106 to 120, measured were the occurrence or nonoccurrence of rupture and ignition by a nail sticking test, the battery temperature by the nail sticking test, the discharge capacity after the first cycle (initial discharge capacity), the reduction rate of the discharge capacity after 300 cycles, the discharge capacity reduction rate at the discharge at 5C, and the discharge capacity reduction rate at the high rate cycle in which the discharge rate was set at 5C as in Example 1. Tables 12 and 13 show the results.

TABLE 12

| | Li molar ratio x | Co molar ratio v | Me3 | Molar ratio t | Halogen | Molar ratio z | A | a (ppm) | B | b (ppm) | Result of nail sticking test |
|---|---|---|---|---|---|---|---|---|---|---|---|
| Example 106 | 1.10 | 0.18 | Ti | 0.02 | F | 0.1 | Na<br>Ca | 2000<br>200 | Fe | 300 | No rupture and no ignition |
| Example 107 | 1.10 | 0.18 | V | 0.02 | F | 0.1 | Na | 1500 | Si | 50 | No rupture and no ignition |
| Example 108 | 1.10 | 0.18 | Cr | 0.02 | F | 0.1 | S | 2500 | Fe | 200 | No rupture and no ignition |
| Example 109 | 1.10 | 0.18 | Zr | 0.02 | Cl | 0.1 | S | 600 | Si | 100 | No rupture and no ignition |
| Example 110 | 1.10 | 0.18 | Nb | 0.02 | Cl | 0.1 | S<br>Ca | 1500<br>200 | Fe | 100 | No rupture and no ignition |
| Example 111 | 1.10 | 0.18 | Mo | 0.02 | Br | 0.1 | Na | 600 | Si | 200 | No rupture and no ignition |
| Example 112 | 1.10 | 0.18 | Hf | 0.02 | Br | 0.1 | Na | 3000 | Fe | 50 | No rupture and no ignition |
| Example 113 | 1.10 | 0.18 | Ta | 0.02 | I | 0.1 | K | 1500 | Si | 300 | No rupture and no ignition |
| Example 114 | 1.10 | 0.18 | W | 0.02 | I | 0.1 | S | 1200 | Fe | 150 | No rupture and no ignition |
| Example 115 | 1.10 | 0.18 | Ti | 0.02 | F | 0.1 | Ca<br>Na<br>S | 400<br>1000<br>2000 | Fe<br>Si | 300<br>100 | No rupture and no ignition |

| | Battery temperature [° C.] | Initial discharge capacity [mAh] | Reduction rate of discharge capacity after 300 cycles [%] | High rate discharge characteristics (%) | High rate cycle characteristics (%) |
|---|---|---|---|---|---|
| Example 106 | 69 | 1740 | −12 | −9 | −9 |
| Example 107 | 69 | 1730 | −8 | −13 | −14 |
| Example 108 | 69 | 1700 | −9 | −14 | −14 |
| Example 109 | 73 | 1680 | −9 | −14 | −20 |
| Example 110 | 72 | 1750 | −11 | −8 | −9 |
| Example 111 | 73 | 1680 | −8 | −13 | −21 |
| Example 112 | 73 | 1770 | −8 | −14 | −22 |
| Example 113 | 73 | 1730 | −15 | −15 | −14 |
| Example 114 | 73 | 1680 | −9 | −13 | −13 |
| Example 115 | 61 | 1740 | −5 | −8 | −9 |

TABLE 13

| | Li molar ratio x | Co molar ratio v | Me3 | Molar ratio t | Halogen | Molar ratio z | A | a (ppm) | B | b (ppm) | Result of nail sticking test |
|---|---|---|---|---|---|---|---|---|---|---|---|
| Example 116 | 1.10 | 0.18 | V | 0.02 | F | 0.1 | Na<br>S<br>Ca | 1500<br>1000<br>200 | Si<br>Fe | 50<br>150 | No rupture and no ignition |
| Example 117 | 1.10 | 0.18 | Cr | 0.02 | F | 0.1 | K<br>Ca<br>S | 1000<br>150<br>2000 | Fe<br>Si | 200<br>70 | No rupture and no ignition |
| Example 118 | 1.10 | 0.18 | Nb | 0.02 | Cl | 0.1 | Ca<br>Na | 200<br>1000 | Fe<br>Si | 100<br>80 | No rupture and no ignition |
| Example 119 | 1.10 | 0.18 | Hf | 0.02 | Br | 0.1 | Na<br>K | 1500<br>1000 | Fe<br>Si | 50<br>150 | No rupture and no ignition |
| Example 120 | 1.10 | 0.18 | W | 0.02 | I | 0.1 | S<br>K | 2000<br>1000 | Fe<br>Si | 150<br>100 | No rupture and no ignition |

TABLE 13-continued

|  | battery temperature [° C.] | Initial discharge capacity [mAh] | Reduction rate of discharge capacity after 300 cycles [%] | discharge characteristics (%) | High rate cycle characteristics (%) |
| --- | --- | --- | --- | --- | --- |
| Example 116 | 61 | 1730 | −5 | −9 | −9 |
| Example 117 | 61 | 1700 | −8 | −8 | −9 |
| Example 118 | 65 | 1770 | −6 | −9 | −9 |
| Example 119 | 66 | 1680 | −8 | −13 | −14 |
| Example 120 | 66 | 1710 | −10 | −14 | −15 |

As is apparent from Tables 12 and 13, the secondary battery for each of Examples 106 to 120 each comprising a positive electrode active material containing the composite oxide having the composition represented by chemical formula (6) referred to previously was free from rupture and ignition in the nail sticking test and was lower than the secondary batteries for Comparative Examples 1 to 13 in any of the discharge capacity reduction rate after 300 cycles, the discharge capacity reduction rate at the discharge at 5C, and the discharge capacity reduction rate in the high rate cycle in which the discharge rate was set at 5C.

Particularly, the secondary batteries for Examples 107, 108, 113 and 114 each comprising the positive electrode active material containing Na, K or S in an amount falling within a range of between 1,000 ppm and 2,500 ppm were found to be lower than the secondary batteries for Examples 109, 111 and 112, in which the content of Na, K or S did not fall within the range of between 1,000 ppm and 2,500 ppm, in the discharge capacity reduction rate at the time of the high rate cycle in which the discharge rate was set at 5C. Further, the secondary batteries for Examples 106, 110, 115 and 116 to 118 each comprising a positive electrode active material containing Ca in an amount not larger than 500 ppm were found to be capable of suppressing each of the capacity reduction rate at the time of the high rate discharge and the discharge capacity reduction rate at the time of the high rate cycle to a level not higher than 10%.

EXAMPLE 121

<Preparation of Positive Electrode>

A band-like positive electrode having an electrode density of 3.0 g/cm$^3$ was prepared by dissolving 91% by weight of a lithium-containing composite oxide powder having a composition equal to that described previously in conjunction with Example 1, 2.5% by weight of an acetylene black, 3% by weight of graphite, and 4% by weight of polyvinylidene fluoride (PVdF) in N-methyl pyrrolidone (NMP), followed by coating an aluminum foil having a thickness of 15 $\mu$m with the resultant solution and subsequently drying and, then, pressing the coating.

<Preparation of Negative Electrode>

A band-like negative electrode having an electrode density of 1.4 g/cm$^3$ was prepared by dissolving 94% by weight of mesophase pitch based carbon fibers having an average fiber diameter of 25 $\mu$m and an average fiber length of 30 $\mu$m, which had been subjected to a heat treatment at 3,000° C. and 6% by weight of polyvinylidene fluoride (PVdF) in N-methyl pyrrolidone (NMP), followed by coating a copper foil having a thickness of 12 $\mu$m with the resultant solution and subsequently drying the coating and, then, pressing the coating.

<Preparation of Electrode Group>

A laminate structure comprising the positive electrode noted above, a separator formed of a polyethylene porous film having a thickness of 16 $\mu$m, a porosity of 50%, and an air permeability of 200 seconds/100 cm$^3$, the negative electrode noted above, and the separator noted above, which were laminated in the order mentioned, was spirally wound. The wound structure was thermally pressed at 90° C. so as to prepare a flat electrode group having a width of 30 mm and a thickness of 3.0 mm. The electrode group thus prepared was housed in a laminate film bag formed of a laminate film having a thickness of 0.1 mm and comprising an aluminum foil having a thickness of 40 $\mu$m and a polypropylene layer formed on each of both surfaces of the aluminum foil. The electrode group housed in the laminate film bag was subjected to vacuum drying at 80° C. for 24 hours.

<Preparation of Nonaqueous Electrolyte (Liquid Nonaqueous Electrolyte)>

A nonaqueous electrolyte was prepared by dissolving lithium tetrafluoroborate (LiBF$_4$) used as a solute in a mixed solvent prepared by mixing ethylene carbonate (EC), γ-butyrolactone (BL) and vinylene carbonate (VC) in a volume ratio of 24:75:1. The solute was dissolved in the mixed solvent in an amount of 1.5 mol/L.

After the nonaqueous electrolyte noted above was poured into the laminate film bag having the electrode group housed therein, the laminate film bag was completely sealed by a heat seal so as to prepare a thin lithium ion secondary battery constructed as shown in FIGS. 2 and 3 and having a width of 35 mm, a thickness of 3.2 mm and a height of 65 mm.

EXAMPLE 122

A thin lithium ion secondary battery was prepared as in Example 121, except that used as the positive electrode active material was a lithium-containing composite oxide having a composition equal to that described previously in conjunction with Example 27.

EXAMPLE 123

A thin lithium ion secondary battery was prepared as in Example 121, except that used as the positive electrode active material was a lithium-containing composite oxide having a composition equal to that described previously in conjunction with Example 50.

EXAMPLE 124

A thin lithium ion secondary battery was prepared as in Example 121, except that used as the positive electrode active material was a lithium-containing composite oxide having a composition equal to that described previously in conjunction with Example 70.

EXAMPLE 125

A thin lithium ion secondary battery was prepared as in Example 121, except that used as the positive electrode active material was a lithium-containing composite oxide having a composition equal to that described previously in conjunction with Example 90.

EXAMPLE 126

A thin lithium ion secondary battery was prepared as in Example 121, except that used as the positive electrode active material was a lithium-containing composite oxide having a composition equal to that described previously in conjunction with Example 106.

<Nail Sticking Test>

A nail sticking test was applied to the secondary battery prepared in each of Examples 121 to 126. In the first step, each of these secondary batteries was charged. Specifically, the battery was charged to 4.2 V under a current value corresponding to 0.2C based the rated design capacity of the secondary battery and, then, maintained constant at 4.2 V. The charging was performed for 8 hours in total. After the charging to 4.2 V, the safety of the secondary battery was studied by applying a nail sticking test. The nail used in the test had a diameter of 2 mm, and the nail speed was set at 135 mm/sec. Also, the temperature elevation of the secondary battery in the nail sticking test was measured by a thermocouple attached on the outer surface of the secondary battery. Table 14 shows the occurrence or nonoccurrence of rupture and ignition in the nail sticking test and the battery temperature in the nail sticking test.

<Discharge Capacity Reduction Rate After 300 Cycles>

A charge-discharge cycle test was applied at room temperature to the secondary battery prepared in each of Examples 121 to 126 so as to obtain the reduction rate of the discharge capacity after 300 cycles. Table 14 shows the results. In the charge-discharge cycle test, the battery was charged to 4.2 V under a current corresponding to 0.5C based the rated design capacity, and the constant voltage of 4.2 V was maintained. The charging was performed for 5 hours in total. On the other hand, the battery was discharged to 2.7 V at the same current. Also, a rest time of 30 minutes was provided between the charging and the discharging.

<Large Current Discharge Characteristics (Discharge Rate Characteristics)>

The secondary battery for each of Examples 121 to 126 was charged to 4.2 V under a current corresponding to 0.5C based the rated design capacity and, then, the voltage was maintained constant at 4.2 V. The charging was performed for 5 hours in total. Further, the battery was discharged 30 minutes later to 2.7 V at a current corresponding to 0.5C so as to measure the initial discharge capacity, which is equal to the discharge capacity in this discharge operation. Then, the secondary battery was charged to 4.2 V at a current corresponding to 0.5C based the rated design capacity, followed by maintaining the constant voltage of 4.2 V. The charging was performed for 5 hours in total. The secondary battery was discharged again 30 minutes later to 2.7 V at a current corresponding to 5C. The discharge capacity at the time when the secondary battery was discharged at 5C was compared with the initial discharge capacity so as to obtain the rate (%) of the reduced capacity at the discharge at 5C relative to the initial discharge capacity. Table 14 also shows the result as the high rate discharge characteristics (discharge rate characteristics).

<High Rate Cycle Characteristics Under the Condition of Large Current Discharge>

The secondary battery for each of Examples 121 to 126 was charged to 4.2 V at a current corresponding to 0.5C based the rated design capacity and, then, the voltage was maintained constant at 4.2 V. The charging was performed for 5 hours in total. Further, the secondary battery was discharged 30 minutes later to 2.7 V at a current corresponding to 5C. The discharge capacity was measured after the charge-discharge operations noted above were repeated 100 times so as to obtain the rate of the reduced capacity at the discharge time after 100 cycles relative to the initial discharge capacity. Table 14 also shows the results as the high rate cycle characteristics.

TABLE 14

| | Result of nail sticking test | battery temperature in nail sticking test (° C.) | Reduction rate of discharge capacity after 300 cycle (%) | High rate discharge characteristics (%) | High rate cycle characteristics (%) |
|---|---|---|---|---|---|
| Example 121 | No rupture and no ignition | 106 | −8 | −14 | −20 |
| Example 122 | No rupture and no ignition | 98 | −9 | −14 | −21 |
| Example 123 | No rupture and no ignition | 82 | −8 | −13 | −21 |
| Example 124 | No rupture and no ignition | 78 | −8 | −13 | −21 |
| Example 125 | No rupture and no ignition | 75 | −11 | −9 | −9 |
| Example 126 | No rupture and no ignition | 65 | −12 | −9 | −9 |

As apparent from Table 14, the thin secondary batteries for Examples 121 to 126 containing as active materials the lithium-containing composite oxides having compositions represented by chemical formulas (1) to (6) referred to previously were free from rupture and ignition in the nail sticking test, capable of suppressing temperature elevation and excellent in safety. Also, the thin secondary batteries for Examples 121 to 126 were found to be excellent in charge-discharge cycle characteristics, high rate discharge characteristics, and high rate cycle characteristics.

Each of the lithium ion secondary batteries for the Examples noted above contains an electrolyte prepared by using an organic solvent, making it necessary to suppress the rupture and ignition. In order to suppress rupture and ignition, it is desirable to set the temperature elevation of the battery at 150° C. or lower, more desirably, at 110° C. or lower, though the temperature elevation in question is dependent on the kind of the organic solvent used for preparing the electrolyte. If the temperature elevation exceeds 110° C., it is possible for rupture and ignition to be caused. In Examples 1 to 126, the battery temperature was not higher than 110° C. and, thus, rupture and ignition of the secondary battery were not brought about. On the other hand, the battery temperature was rapidly elevated to 400° C. or more in Comparative Examples 2, 4 and 6 to 13, leading to the rupture and ignition of the secondary battery.

Incidentally, the Examples described above are directed to a cylindrical lithium ion secondary battery and a thin plate type lithium ion secondary battery. However, the lithium ion secondary battery of the present invention is not limited to a cylindrical battery and a thin plate type battery. It is also possible to apply the technical idea of the present invention to, for example, a rectangular or button type lithium ion secondary battery in addition to the cylindrical lithium ion secondary battery and the thin plate type lithium ion secondary battery. It is also possible to use a laminate film as a casing in place of a metal can.

As described above in detail, the present invention provides a positive electrode active material capable of preventing rupture and ignition in the nail sticking test and also capable of improving the high rate discharge characteristics (discharge rate characteristics), and a lithium ion secondary battery utilizing the particular positive electrode active material.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lithium ion secondary battery, comprising:
a positive electrode comprising an active material containing a composite oxide;
a negative electrode; and a nonaqueous electrolyte;
the composite oxide having a composition represented by a structural formula (1) given below:

$$Li_x(Ni_{1-y}Me1_y)(O_{2-z}X_z)+A \qquad (1)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains Ca and at least one element selected from the group consisting of Na, K and S, and each of the Na content, the K content and the S content of the composite oxide falls within a range of from 600 ppm to 3,000 ppm, and the Ca content in said composite oxide is not higher than 550 ppm.

2. A lithium ion secondary battery according to claim 1, wherein said element A includes a combination of Ca, Na and S, a combination of Na and Ca or a combination of S and Ca.

3. A lithium ion secondary battery according to claim 1, wherein each of the Na content, the K content and the S content in said composite oxide falls within a range of from 1,000 ppm to 2,500 ppm.

4. A lithium ion secondary battery according to claim 1, wherein at least a part of said element A is precipitated in triple points present in grain boundaries of said composite oxide.

5. A lithium ion secondary battery, comprising:
a positive electrode comprising an active material containing a composite oxide;
a negative electrode; and
a nonaqucous electrolyte;
the composite oxide having a composition represented by a structural formula (3) given below:

$$Li_x(Ni_{1-v-s}Co_vMe2_s)(O_{2-z}X_z)+A \qquad (3)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb and Bi, X is at least one kind of a halogen element selected from the group consisting of F, Cl, Br and I, the molar ratios x, v, s and z are $0.02 \leq x \leq 1.3$, $0.005 \leq v \leq 0.5$, $0.005 \leq s \leq 0.5$ and $0.01 \leq z \leq 0.5$, A contains Ca and at least one element selected from the group consisting of Na, K and S, and each of the Na content, the K content and the S content of the composite oxide falls within a range of from 600 ppm to 3,000 ppm and the Ca content in said comnosite oxide falls within a range of from 20 ppm to 500 ppm.

6. A lithium ion secondary battery according to claim 5, wherein said element Me2 is at least one kind of an element selected from the group consisting of Ti, V, Cr, Zr, Nb, Mo, Hf, Ta and W.

7. A lithium ion secondary battery, comprising:
a positive electrode comprising an active material containing a composite oxide;
a negative electrode; and
a nonaqucous electrolyte;
the composite oxide having a composition represented by a structural formula (4) given below:

$$Li_x(Ni_{1-v-s}Co_vMe2_s)(O_{2-z}X_z)+A+bB \qquad (4)$$

where Me2 is at least one kind of an element selected from the group consisting of B, Mg, Al, Sc, Ti, V, Cr, Mn, Cu, Zn, Ga, Y, Zr, Nb, Mo, Tc, Ru, Sn, La, Hf, Ta, W, Re, Pb and Bi, X is at least one kind of a halogen element selected from the group consisting of F, Cl, Br and I, the molar ratios x, v, sand z are $0.02 \leq x \leq 1.3$, $0.005 \leq v \leq 0.5$, $0.005 \leq s \leq 0.5$ and $0.01 \leq z \leq 0.5$, A contains Ca and at least one element selected from the group consisting of Na, K and S, each of the Na content, the K content and the S content of the composite oxide falls within a range of from 600 ppm to 3,000 ppm, the Ca content in said composite oxide is not higher than 500 ppm, B contains at least one element selected from the group consisting of Si and Fe, and the content b of said element B in said composite oxide falls within a range of from 20 ppm to 500 ppm.

8. A lithium ion secondary battery according to claim 7, wherein said element Me2 is at least one kind of an element selected from the group consisting of Ti, V, Cr, Zr, Nb, Mo, Hf, Ta and W.

9. A lithium ion secondary battery, comprising:
a positive electrode comprising an active material containing a composite oxide;
a negative electrode; and a nonaqueous electrolyte;
the composite oxide having a composition represented by a structural formula (1) given below:

$$Li_x(Ni_{1-y}Me1_y)(O_{2-z}X_z)+A \qquad (1)$$

where Me1 is at least one kind of an element selected from the group consisting of B, Mg, Al, Sc, Ti, V, Cr, Mn, Co, Cu, Zn, Ga, Y, Zr, Nb, Mo, Tc, Ru, Sn, La, Hf, Ta, W, Re, Pb and Bi, X is at least one kind of a halogen element selected from the group consisting of F, Cl, Br and I, the molar ratios x, y, z are $0.02 \leq x \leq 1.3$, $0.005 \leq y \leq 0.5$, and $0.01 \leq z \leq 0.5$, A contains Na and S, and each of the Na content and the S content of the composite oxide falls within a range of from 600 ppm to 3,000 ppm.

10. A lithium ion secondary battery according to claim 9, wherein at least a part of said element A and at least a part of said element B are precipitated in triple points present in grain boundaries of said composite oxide.

11. A lithium ion secondary battery according to claim 9, wherein said composite oxide further includes an element B containing at least one element selected from the group consisting of Se and Fe.

12. A lithium ion secondary battery according claim 11, wherein the content of said element B in said composite oxide falls within a range of from 20 ppm to 500 ppm.

13. A lithium ion secondary battery according to claim 11, wherein the content of said element B in said composite oxide falls within a range of from 20 ppm to 250 ppm.

14. A lithium ion secondary battery according to claim 1, wherein the Ca content in the composite oxide falls within a range of from 20 ppm to 500 ppm.

15. A lithium ion secondary battery according to claim 1, wherein the Ca content in the composite oxide falls within a range of from 50 ppm to 500 ppm.

16. A lithium ion secondary battery according to claim 1, wherein the A content in the composite oxide falls within a range of from 600 ppm to 7000 ppm.

17. A lithium ion secondary battery according to claim 1, wherein the A content in the composite oxide falls within a range of from 1000 ppm to 5000 ppm.

18. A lithium ion secondary battery according to claim 9, wherein the A content in the composite oxide falls within a range of from 600 ppm to 7000 ppm.

19. A lithium ion secondary battery according to claim 9, wherein said composite oxide further includes at least one element selected from the group consisting of Ca and K.

* * * * *